United States Patent
Kondo et al.

(10) Patent No.: US 8,031,232 B2
(45) Date of Patent: Oct. 4, 2011

(54) IMAGE PICKUP APPARATUS INCLUDING A FIRST IMAGE FORMATION SYSTEM AND A SECOND IMAGE FORMATION SYSTEM, METHOD FOR CAPTURING IMAGE, AND METHOD FOR DESIGNING IMAGE PICKUP APPARATUS

(75) Inventors: Tetsujiro Kondo, Tokyo (JP); Yasushi Tatehira, Kanagawa (JP); Tetsushi Kokubo, Kanagawa (JP); Kenji Tanaka, Kanagawa (JP); Hitoshi Mukai, Kanagawa (JP); Hirofumi Hibi, Kanagawa (JP); Kazumasa Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 528 days.

(21) Appl. No.: 11/814,151

(22) PCT Filed: Jan. 13, 2006

(86) PCT No.: PCT/JP2006/300360
§ 371 (c)(1),
(2), (4) Date: Nov. 20, 2008

(87) PCT Pub. No.: WO2006/077777
PCT Pub. Date: Jul. 27, 2006

(65) Prior Publication Data
US 2009/0128643 A1 May 21, 2009

(30) Foreign Application Priority Data

Jan. 18, 2005 (JP) .................. 2005-010769
Mar. 8, 2005 (JP) .................. 2005-063675

(51) Int. Cl.
*H04N 5/225* (2006.01)

(52) U.S. Cl. ............... 348/218.1; 348/335; 438/144; 257/294; 359/362

(58) Field of Classification Search ............ 348/240.3, 348/222.1, 241, 218.1, 262–265, 218, 335–369; 356/3; 396/89; 438/27, 60, 75, 144, 461; 257/98, 226, 232–234, 294; 359/362, 503, 591, 599, 618–640, 733, 558–576
See application file for complete search history.

(56) References Cited

U.S. PATENT DOCUMENTS 4,323,925 A  4/1982 Abell et al.
(Continued)

FOREIGN PATENT DOCUMENTS

EP  1 377 026 A2  1/2004
(Continued)

OTHER PUBLICATIONS

Supplemental European Search Report for European Application No. EP 06 71 1645, dated Apr. 7, 2011, 7 pages.

*Primary Examiner* — Sinh Tran
*Assistant Examiner* — Kent Wang
(74) *Attorney, Agent, or Firm* — Finnegan, Henderson, Farabow, Garrett & Dunner, L.L.P.

(57) ABSTRACT

The present invention relates to an image pickup apparatus, a method for capturing an image, and a method for designing the image pickup apparatus capable of realizing a fixed focal length image pickup apparatus of high resolution and fine resolution at a low cost by disposing a plurality of image pickup elements therein. An image pickup device 31 is of a focal coincidence type having a plurality of image pickup elements, such as CCD sensors 62-1 to 62-3, arranged in an array. That is, the image pickup device 31 has an optical system including a first image formation system 41 for forming an image of focal coincidence, a field lens 43 disposed in an image formation plane or in the vicinity of the image formation plane of the first image formation system, and a second image formation system group formed by a plurality of second image formation systems arranged in an array and including an image pickup element CCD sensor 62-K (K is a value between 1 and 3 in this example) for capturing the image formed on itself and a zoom lens 61-K for reforming a predetermined, part of the image formed on the image formation plane on the CCD sensor 62-K. The present invention is applicable to a digital still camera and a digital video camera including a plurality of image pickup elements.

17 Claims, 18 Drawing Sheets

U.S. PATENT DOCUMENTS

| | | | |
|---|---|---|---|
| 4,383,170 A * | 5/1983 | Takagi et al. | 250/216 |
| 4,690,549 A * | 9/1987 | Nakada | 356/4.04 |
| 4,890,314 A | 12/1989 | Judd et al. | |
| 5,151,790 A * | 9/1992 | Takatori et al. | 348/335 |
| 5,757,423 A * | 5/1998 | Tanaka et al. | 348/218.1 |
| 5,760,832 A * | 6/1998 | Yamanaka et al. | 348/264 |
| 6,909,554 B2 * | 6/2005 | Liu et al. | 359/626 |
| 7,236,304 B2 * | 6/2007 | Okayama et al. | 359/626 |
| 7,453,510 B2 * | 11/2008 | Kolehmainen et al. | 348/340 |
| 7,511,756 B2 * | 3/2009 | Kawai | 348/335 |
| 7,688,376 B2 * | 3/2010 | Kondo et al. | 348/340 |
| 7,701,489 B1 * | 4/2010 | Christie et al. | 348/224.1 |
| 2002/0163582 A1 | 11/2002 | Gruber et al. | |
| 2004/0056966 A1 * | 3/2004 | Schechner et al. | 348/229.1 |
| 2004/0062454 A1 | 4/2004 | Komiya et al. | |

FOREIGN PATENT DOCUMENTS

| | | |
|---|---|---|
| JP | 7-184105 | 7/1995 |
| JP | 7-222045 | 8/1995 |
| JP | 2001-45508 | 2/2001 |
| JP | 2001-223931 | 8/2001 |

* cited by examiner

PRIOR ART

FIG. 8

| ZOOM RATIO r | POSITION u | POSITION v | COEFFICIENT b1 | COEFFICIENT b2 | COEFFICIENT b3 | COEFFICIENT b4 | COEFFICIENT b5 | COEFFICIENT b6 |
|---|---|---|---|---|---|---|---|---|
| 1.1 | 0 | 0 | ... | ... | ... | ... | ... | ... |
| 1.2 | 1 | 2 | ... | ... | ... | ... | ... | ... |
| ... | ... | ... | ... | ... | ... | ... | ... | ... |
| ... | ... | ... | ... | ... | ... | ... | ... | ... |

FIG. 11

| R | G | B | CODE |
|---|---|---|------|
| 0 | 0 | 1 | 0 |
| 0 | 1 | 0 | 1 |
| 0 | 1 | 1 | 2 |
| 1 | 0 | 0 | 3 |
| 1 | 0 | 1 | 4 |
| 1 | 1 | 0 | 5 |
| 1 | 1 | 1 | 6 |

FIG. 12

| VALUE X | DIFFERENCE | SUM | DIFFERENCE CODE Y1 |
|---|---|---|---|
| 0 |  | 0 | 0 |
| 1 | 1 | 1 | 1 |
| 2 | 1 | 2 | 2 |
| 3 | 1 | 3 | 3 |
| 4 | 1 | 4 | 4 |
| 5 | 1 | 5 | 5 |
| 6 | 1 | 6 | 6 |
| 7 | 1 | 7 | 0 |
| 8 | 2 | 9 | 2 |
| 9 | 2 | 11 | 4 |
| 10 | 2 | 13 | 6 |
| 11 | 2 | 15 | 1 |
| 12 | 2 | 17 | 3 |

| VALUE X | DIFFERENCE | SUM | DIFFERENCE CODE Y1 |
|---|---|---|---|
| 13 |  | 19 | 5 |
| 14 | 2 | 21 | 0 |
| 15 | 3 | 24 | 3 |
| 16 | 3 | 27 | 6 |
| 17 | 3 | 30 | 2 |
| 18 | 3 | 33 | 5 |
| 19 | 3 | 36 | 1 |
| 21 | 3 | 39 | 4 |
| 22 | 3 | 42 | 0 |
| 23 | 4 | 46 | 4 |
| 24 | 4 | 50 | 1 |
| 25 | 4 | 54 | 5 |
| 26 | 4 | 58 | 2 |

| VALUE X | DIFFERENCE | SUM | DIFFERENCE CODE Y1 |
|---|---|---|---|
| 27 |  | 62 | 6 |
| 28 | 4 | 66 | 3 |
| 29 | 4 | 70 | 0 |
| 30 | 5 | 75 | 5 |
| 31 | 5 | 80 | 3 |
| 32 | 5 | 85 | 1 |
| 33 | 5 | 90 | 6 |
| 34 | 5 | 95 | 4 |
| 35 | 5 | 100 | 2 |
| 36 | 5 | 105 | 0 |
| 37 | 6 | 111 | 6 |
| 38 | 6 | 117 | 5 |
| 39 | 6 | 123 | 4 |

| VALUE X | DIFFERENCE | SUM | DIFFERENCE CODE Y1 |
|---|---|---|---|
| 40 |  | 129 | 3 |
| 41 | 6 | 135 | 2 |
| 42 | 6 | 141 | 1 |
| 43 | 6 | 147 | 0 |

| 0-0 0 | 1-0 0 | 2-0 1 | 3-0 3 | 4-0 6 |
|---|---|---|---|---|
| 0-1 0 | 1-1 0 | 2-1 1 | 3-1 3 | 4-1 6 |
| 0-2 1 | 1-2 1 | 2-2 2 | 3-2 4 | 4-2 0 |
| 0-3 3 | 1-3 3 | 2-3 4 | 3-3 6 | 4-3 2 |
| 0-4 6 | 1-4 6 | 2-4 0 | 3-4 2 | 4-4 5 |

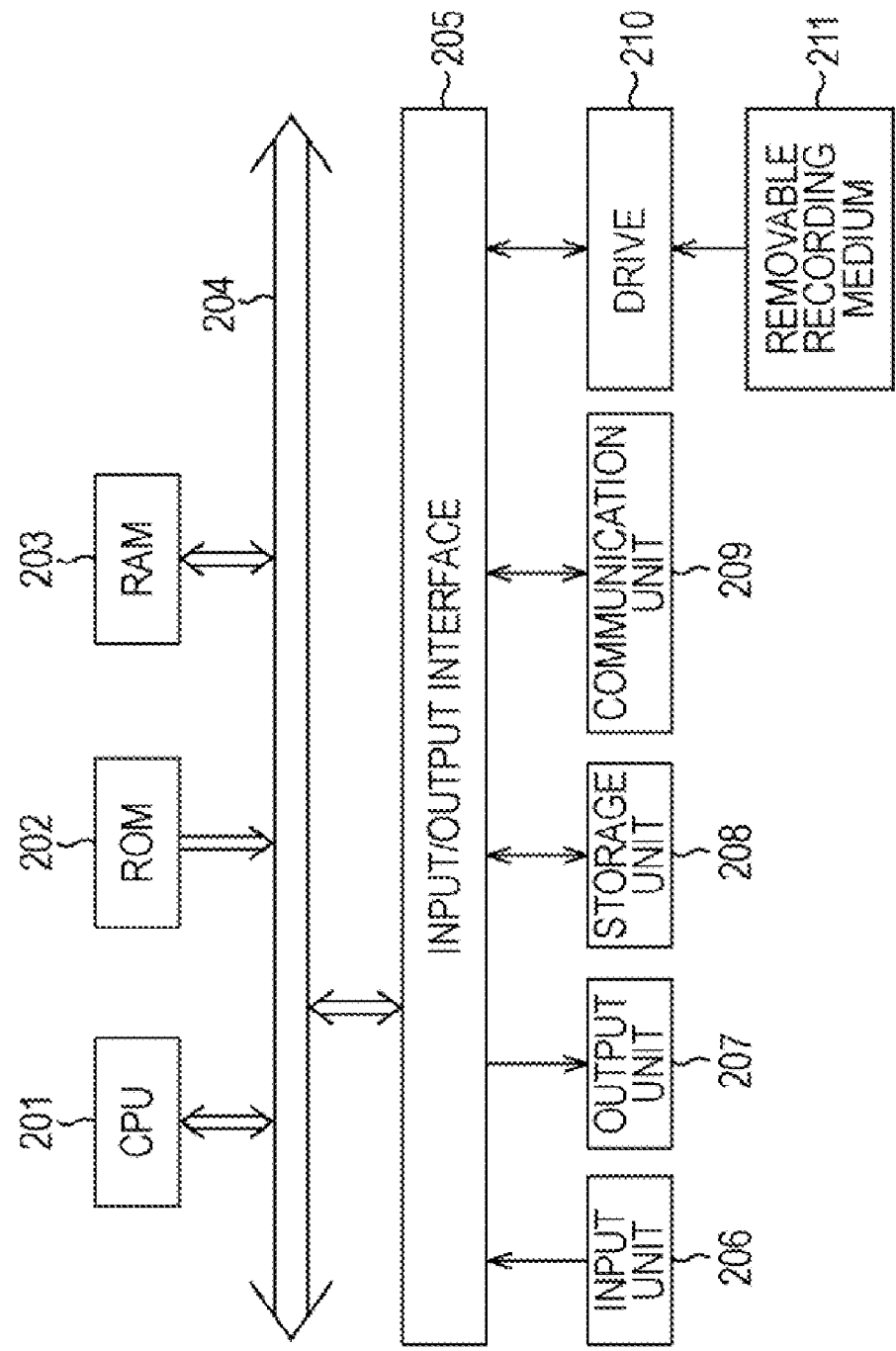

IMAGE PICKUP APPARATUS INCLUDING A FIRST IMAGE FORMATION SYSTEM AND A SECOND IMAGE FORMATION SYSTEM, METHOD FOR CAPTURING IMAGE, AND METHOD FOR DESIGNING IMAGE PICKUP APPARATUS

TECHNICAL FIELD

The present invention relates to an image pickup apparatus, a method for capturing an image, and a method for designing an image pickup apparatus and, in particular, to a low-cost high-resolution and fine-resolution fixed focal length image pickup apparatus having a plurality of image pickup elements arranged therein, a method for capturing an image for use in the image pickup apparatus, and a method for designing the image pickup apparatus.

BACKGROUND ART

In recent years, a variety of methods for capturing a high-resolution image have been developed. These image pickup methods fall into two categories: a method for increasing the resolution of an image pickup element, such as a charge-coupled device (CCD) sensor, and a method for using a plurality of image pickup elements so as to capture a high-resolution image.

The latter method, that is, the method for using a plurality of image pickup elements so as to capture a high-resolution image is described in, for example. Patent Document 1 and Non-Patent Document 1.

In the method described in Patent Document 1, an image is captured by using the aperture of a CCD sensor and a so-called pixel shifting method. That is, this method is quite simple. A light beam is split in four directions by a prism. To receive each of the split light beams, CCD sensors are shifted from each other by a half pixel.

The method described in Non-Patent Document 1 is used in the Mega Vision method supported by the Mechanical Social Systems Foundation. An image is separated into three sub-images by a prism. The three sub-images are captured by three HD camcorders.

[Patent Document 1] Japanese Unexamined Patent Application Publication No. 2001-45508

[Non-Patent Document 1] "Description of Mega Vision supported by the Mechanical Social Systems Foundation" at Machine Industry Memorial Foundation website (URL: http://www.tepia.or.jp/14th/hds.html, searched for on 17, Jan., 2005)

DISCLOSURE OF INVENTION

However, the method described in Patent Document 1 has the following first to fourth drawbacks.

The first drawback is that, although a high-resolution image can be obtained when four CCD sensors are used, the resolution of the image cannot be increased even when the number of CCD sensors is increased to 16 or to 64, if the aperture ratio is fully used. That is, an advantage derived from the number of CCD sensors cannot be obtained.

The second drawback is that the prism of the image pickup apparatus described in Patent Document 1 is significantly costly.

The third drawback is that, although only one prism is sufficient for four CCD sensors, five prisms are required for sixteen CCD sensors and twenty-one CCD sensors are required for sixty-four CCD sensors. That is, as the number of employed CCD sensors increases, the number of required prisms significantly increases.

The fourth drawback is that the density of pixels of an image to be captured cannot be partially changed.

In addition, from the method described in Patent Document 1, it is easily conceivable that, as shown in FIG. 1, the entire imaging surfaces of CCD sensors 1-1 to 1-4 are shifted in place of being shifted by a half pixel.

However, even in the method shown in FIG. 1, the above-described third drawback and fourth drawback still remain. Furthermore, the method shown in FIG. 1 has the following fifth drawback.

The fifth drawback is that when the four CCD sensors 1-1 to 1-4 are used, the size of a prism 2 is needed to be enlarged by four times, which is significantly costly.

In summary, in the method described in Patent Document 1 or the method using a prism illustrated in FIG. 1, a plurality of large and high-precision prisms are required when the number of CCD sensors is increased. However, the manufacturing step for producing a large prism is difficult. Accordingly, the cost for producing each prism is high, and therefore, the fetal cost is significantly increased. In addition, since light beams from the same angle of view are made incident on the surfaces of the CCD sensors, the density of pixels of an image to be captured cannot be partially changed unless the density of elements of a CCD sensor is changed.

Accordingly, the digital back 528C available from Basselblad A/S, and the electron microscope digital camera DXM1200 available from Nikon Corporation employ a method in which a CCD sensor, an image pickup element, is shifted by a half pixel in a time direction in place of shifting a prism.

However, even in this method, the above-described first and fourth drawbacks still remain. Furthermore, this method has the following sixth drawback.

The sixth drawback is as follows: although the intensify of light beams made incident on the CCD sensor is sufficient, a long image capturing time is required since the pixels are shifted in a time direction. Therefore, it is difficult to capture a moving image.

In addition, in the method described in Non-Patent Document 1, the above-described second to fourth drawbacks still remain. Furthermore, this method has the following eighth and ninth drawbacks.

The eighth drawback is that it is difficult to increase the number of arranged cameras (image pickup elements) due to the size of the camera body.

The ninth drawback is that since the image has no blending portion (overlap width), an image is distorted at the boundaries and some method is required for addressing this issue.

In summary, it is very difficult for all of the known methods to manufacture a high-resolution and fine-resolution fixed focal length image pickup apparatus having a plurality of image pickup elements arranged therein at a low cost.

Accordingly, the present invention provides a high-resolution and fine-resolution fixed, focal length image pickup apparatus having a plurality of image pickup elements arranged therein and capable of being manufactured at a low cost.

According to the present invention, an image pickup apparatus of a focal coincidence type having a plurality of image pickup elements arranged in an array is provided. The image pickup apparatus includes an optical system including a first image formation system for forming an image of focal coincidence, an image formation plane in which the image is formed by the first image formation system, and a second image formation system group. The second image formation system group includes a plurality of second image formation systems each including one of the image pickup elements. Each of the image pickup elements captures an image obtained by reforming a predetermined part of the image formed in the image formation plane. The plurality of second image formation systems are arranged in an array.

The image pickup apparatus can further include a field lens disposed in the image formation plane or in the vicinity of the image formation plane. The image formation plane connects the first image formation system with the second image formation system group.

The image pickup apparatus can further include a diffuser disposed in the image formation plane or in the vicinity of the image formation plane. The image formation plane connects the first image formation system with the second image formation system group.

Each of the plurality of the second image formation systems included in the second image formation system group can be disposed so as to maintain a part of a first image captured by the image pickup element included in the one of the second image formation systems and a part of a second image captured by the image pickup element included in another one of the second image formation system as a blending region where the first image is connected to the second image.

Each of the plurality of the second image formation systems included in the second image formation system group can include a lens for reforming the predetermined part, of the image formed in the image formation plane on the one of image pickup elements, and the following expression can be satisfied:

$$2 \times F \times \tan(\phi/2) > D$$

where F denotes a distance between the image formation plane and the lens, $\phi$ denotes the width of a light beam corresponding to the blending region among light beams output from the image formation plane, and D denotes a distance between the one of image pickup elements and the image pickup element immediately adjacent to the one of image pickup elements.

The image pickup apparatus can further include a mechanism configured to individually change the position of the image pickup element and zooming of the lens in each of the plurality of the second image formation systems included in the second image formation system group independently from other ones of the second image formation systems.

The mechanism can include a first actuator configured to drive each of a plurality of the lenses independently from another one of the lenses to change the zooming thereof and a second actuator configured to drive each of a plurality of the image pickup apparatuses independently from the other one of the image pickup apparatuses to change the position thereof.

The image pickup apparatus can cause each of at least one of the image pickup elements included in at least one of the second image formation systems included in the second image formation system group to capture an image having a resolution higher than those captured by the other image pickup elements using the mechanism, and the image pickup apparatus can further include a computing unit configured to perform computation so as to determine a range of the image captured in high resolution when the high-resolution image is captured.

The image pickup apparatus can further include an interface unit through which a user performs an operation to select the range of the image captured in high resolution. The computing unit can compute the range of the image captured in high resolution on the basis of the user operation through the interface unit.

The image pickup apparatus can further include a phase correction information holding unit configured to hold phase correction information used for correcting the phases of images formed on the plurality of image pickup elements.

The image pickup apparatus can further include a phase correction information computing unit configured to compute the phase correction information in advance using images obtained by reforming an image of a predetermined test pattern formed in the image formation plane on at least one of the plurality of image pickup elements and configured to cause the phase correction information holding unit to hold the phase correction information.

The image pickup apparatus can further include a phase correction unit configured to correct the phase of each of the images obtained by reforming an image of an object formed on the image formation plane on the plurality of image pickup elements using the phase correction information held in the phase correction information holding unit.

The image pickup apparatus can further include a luminance correction information holding unit configured to hold luminance correction information used for correcting the luminance of images formed on the plurality of image pickup elements.

The image pickup apparatus can further include a luminance correction information computing unit configured to compute the luminance correction information in advance using images obtained by reforming an image of a predetermined test pattern formed in the image formation plane on at least one of the plurality of image pickup elements and configured to cause the luminance correction information holding unit to hold the luminance correction information.

The image pickup apparatus can further include a luminance correction unit configured to correct the luminance of each of the images obtained by reforming an image of an object formed on the image formation plane on the plurality of image pickup elements using the luminance correction information held in the luminance correction information holding unit.

In the image pickup apparatus according to the present invention, an image of focal coincidence is formed in the image formation plane by the first image formation system. A predetermined part of the image formed in the image formation plane is reformed on each of the image pickup elements included in the plurality of second image formation systems by the second image formation systems. Each of the image pickup elements captures the image reformed thereon.

According to the present invention, a first method for capturing an image for use in an image pickup apparatus including at least a first image formation system and a plurality of second image formation systems having image pickup elements is provided. The method includes the steps of forming an image of focal coincidence on a predetermined image formation plane with the first image formation system, reforming a predetermined part of the image formed on the image formation plane on one of the image pickup elements included in one of the second image formation systems by the one of the second image formation systems, and capturing the image formed on each of the image pickup elements by the image pickup element.

In the first, method according to the present invention, an image of focal coincidence is formed in the image formation plane by the first image formation system. A predetermined part of the image formed in the image formation plane is reformed on each of the image pickup elements included in the plurality of second image formation systems by the second image formation systems. The image reformed on each of the image pickup elements is captured with the image pickup element.

According to the present invention, a method for designing an image pickup apparatus including at least a first image formation system and a plurality of second image formation systems having image pickup elements is provided. The method includes the steps of forming an image of focal coincidence on a predetermined image formation plane with the first image formation system, and reforming a predetermined part of the image formed on the image formation plane on one of the image pickup elements included in one of the second image formation systems by the one of the second image formation systems.

In the method for designing an image pickup apparatus according to the present invention, an image pickup apparatus is designed so that an image of focal coincidence is formed in the image formation plane by the first image formation system, and a predetermined part of the image formed in the image formation plane is reformed on each of the image pickup elements included in the plurality of second image formation systems by the second image formation systems.

According to the present invention, a second method for capturing an image for use in an image pickup apparatus is provided. The image pickup apparatus includes an optical system including a first image formation system for forming an image of focal coincidence, an image formation plane in which the image is formed, by the first image formation system, and a second image formation system group including a plurality of second image formation systems each including an image pickup element that captures an image formed thereon and a lens that reforms a predetermined part of the image formed in the image formation plane on the image pickup element, where the plurality of second image formation systems are arranged in an array. The method includes the steps of, in order to maintain a part of a first image captured by the image pickup element included in one of the second image formation systems and a part of a second image captured by the image pickup element included in another second image formation system as a blending region where the first image is connected to the second image, disposing each of the plurality of second image formation systems included in the second image formation system group so as to satisfy the following expression:

$$2 \times F \times \tan(\phi/2) > D$$

where F denotes a distance between the image formation plane and the lens, $\phi$ denotes the width of a light beam corresponding to the blending region among light beams output from the image formation plane, and D denotes a distance between the one of image pickup elements and the image pickup element immediately adjacent to the one of image pickup elements, and capturing an image of an object by the image pickup apparatus.

In the second method for capturing an image according to the present invention, the plurality of second image formation systems included in the second image formation system group are disposed so as to maintain a part of a first image captured by the image pickup element included in one of the second image formation systems and a part of a second image captured by the image pickup element included in another second image formation system as a blending region where the first image is connected to the second image. More specifically, the plurality of second image formation systems are disposed so as to satisfy the following expression:

$$2 \times F \times \tan(\phi/2) > D$$

where F denotes a distance between the image formation plane and the lens, $\phi$ denotes the width of a light beam corresponding to the blending region, and D denotes a distance between the one of image pickup elements and the image pickup element immediately adjacent to the one of image pickup elements. Subsequently, an image of an object is captured with the image pickup apparatus.

ADVANTAGES

As described above, according to the present invention, an image pickup apparatus having a plurality of image pickup elements arranged therein can be achieved. In particular, a high-resolution and fine-resolution fixed focal length image pickup apparatus can be achieved at a low cost. In addition, a method for capturing an image required for achieving a high-resolution and fine-resolution fixed focal length image pickup apparatus at a low cost can be provided.

BRIEF DESCRIPTION OF THE DRAWINGS

FIG. 8 is a diagram illustrating luminance correction information;

FIG. 11 is a diagram illustrating seven (R, G, B) color-patterns and codes associated with these color patterns;

FIG. 12 is a diagram illustrating an example of a first-order difference code;

FIG. 20 is a block diagram illustrating another example of the configuration of a signal processing unit of the image pickup apparatus shown in FIG. 2.

REFERENCE NUMERALS

Figure 1:
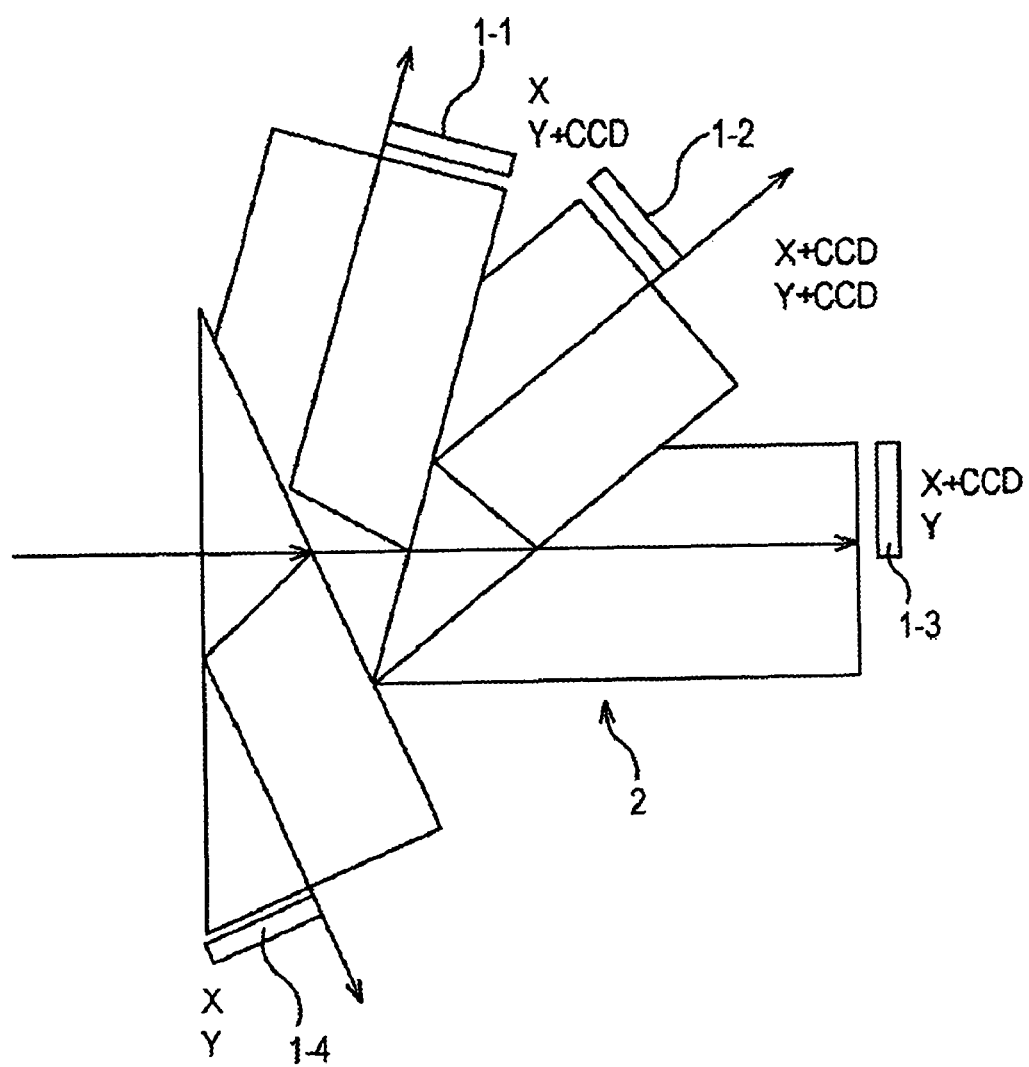
FIG. 1 is a diagram illustrating an existing optical system.

31 image pickup apparatus
41 first image formation system
42 second image formation system
43 field lens
44 signal processing unit
45 high-resolution image capturing range selection interface
51 objective lens
61-1 to 61-3 zoom lens
62-1 to 62-3 CCD sensor
71-1 to 71-3 memory
72 phase correction circuit
73 phase correction information memory
74 luminance detection/correction circuit
75 luminance correction information memory
76 high-resolution image capturing range computing circuit
77 zoom actuator
78 position control actuator
201 CPU
202 ROM
203 RAM
208 storage unit
211 removable recording medium

BEST MODE FOR CARRYING OUT THE INVENTION

Methods according to the present invention are described below.

The methods according to the present invention include the following first to third methods.

In the first method, an image is formed twice. That is, a first image formation system (hereinafter also referred to as a "first optical system") and a second image formation system (hereinafter also referred to as a "second optical system") are formed. According to the first method, image capturing providing a blending region (e.g., a blending region 103 shown in FIG. 6, which is described below) can be provided without physical interference between a fixed focal point and an image pickup element (e.g., a CCD sensor). However, to provide the blending region, arrangement of the image pickup elements is important. The reason is described below with reference to FIG. 5.

In the second method, at least one of the number of image pickup elements, the position of the image pickup element, and the amount of zoom in the second image formation system formed through the first method is changed. According to the second method, image capturing in which a high-resolution image can be partially obtained can be provided. In addition, the need for a prism can be eliminated for an image pickup apparatus according to the second method (and the first method). Accordingly, even when the number of image pickup elements (e.g., CCD sensors) is increased, the cost does not increase.

In the third method, a phase correction process or a phase detection process, a luminance correction process or a luminance detection process, and a process for automatically acquiring phase correction information or luminance correction information required for performing these processes are achieved. As used herein, the term "automatically" refers to a process performed by the image pickup apparatus on the basis of the determination thereof without any user intervention. The above-described various processes performed according to the third method are described below with reference to flow charts in drawings subsequent to FIG. 10.

In practice, an image pickup apparatus using the first to third methods cannot be achieved using a known imaging system of single image formation using a prism. Therefore, the present inventor invented an image pickup apparatus including an imaging system using the first to third methods. Such an image pickup apparatus has a configuration shown in FIG. 2, for example. That is, FIG. 2 illustrates an image pickup apparatus according to an embodiment of the present invention.

Figure 2:
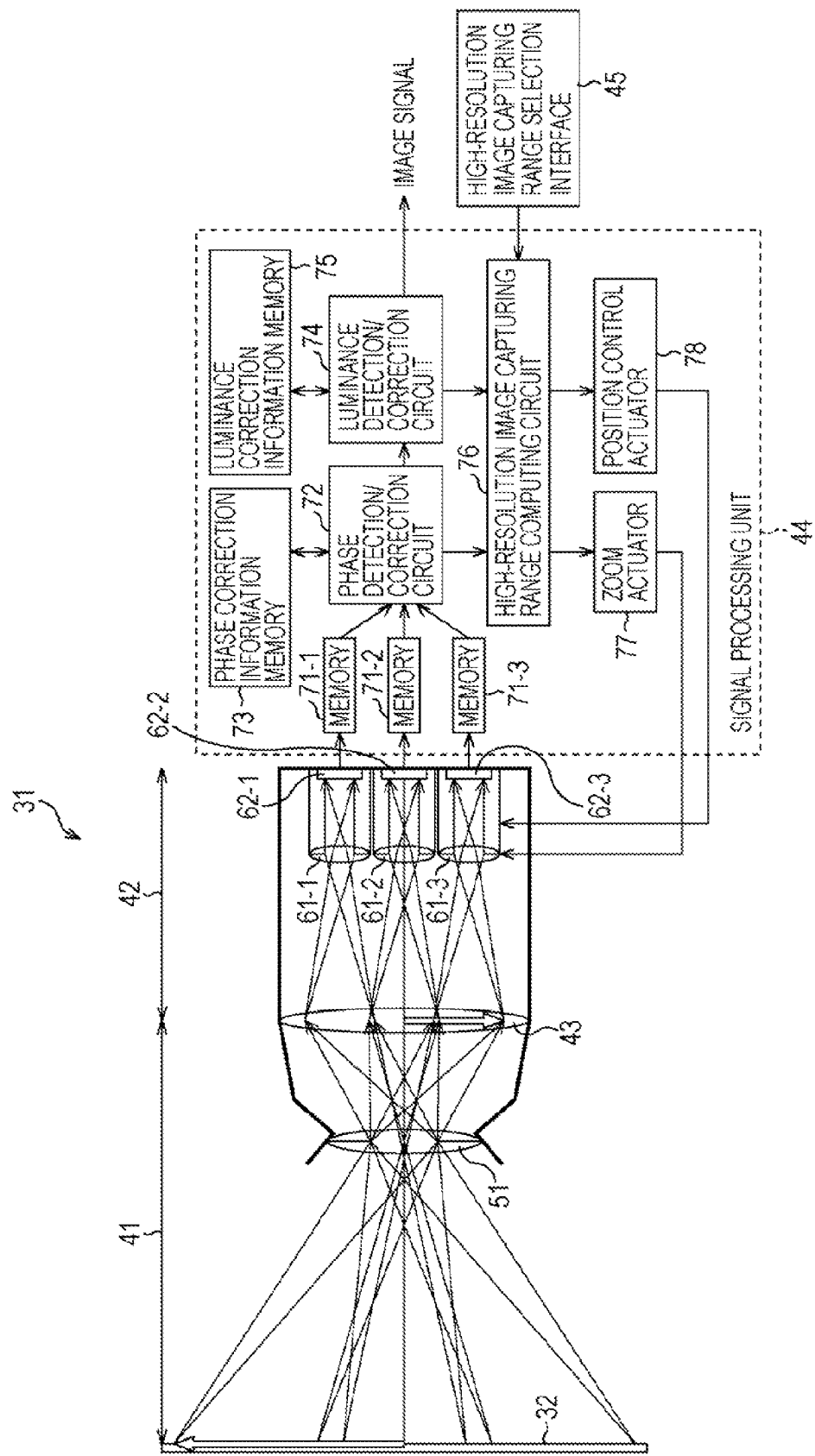
FIG. 2 is a diagram illustrating an exemplary structure of an image pickup apparatus according to the present invention.

In an example shown in FIG. 2, an image pickup apparatus 31 includes a first image formation system (first optical system) 41, a second image formation system (second optical system) group 42, a field lens 43, a signal processing unit 44, and a high-resolution image capturing range selection interface 45.

An optical system including the first image formation system 41, the second image formation system group 42, and the field lens 43 is described first.

As noted above, the known optical apparatuses (image pickup apparatuses), such as one described in Patent Document 1, form an image only once. Thereafter, the optical apparatuses separate the image using a prism. In this way, in the known method, in general, a light beam is separated by a prism. Accordingly, the above-described various drawbacks appear.

Figure 3:
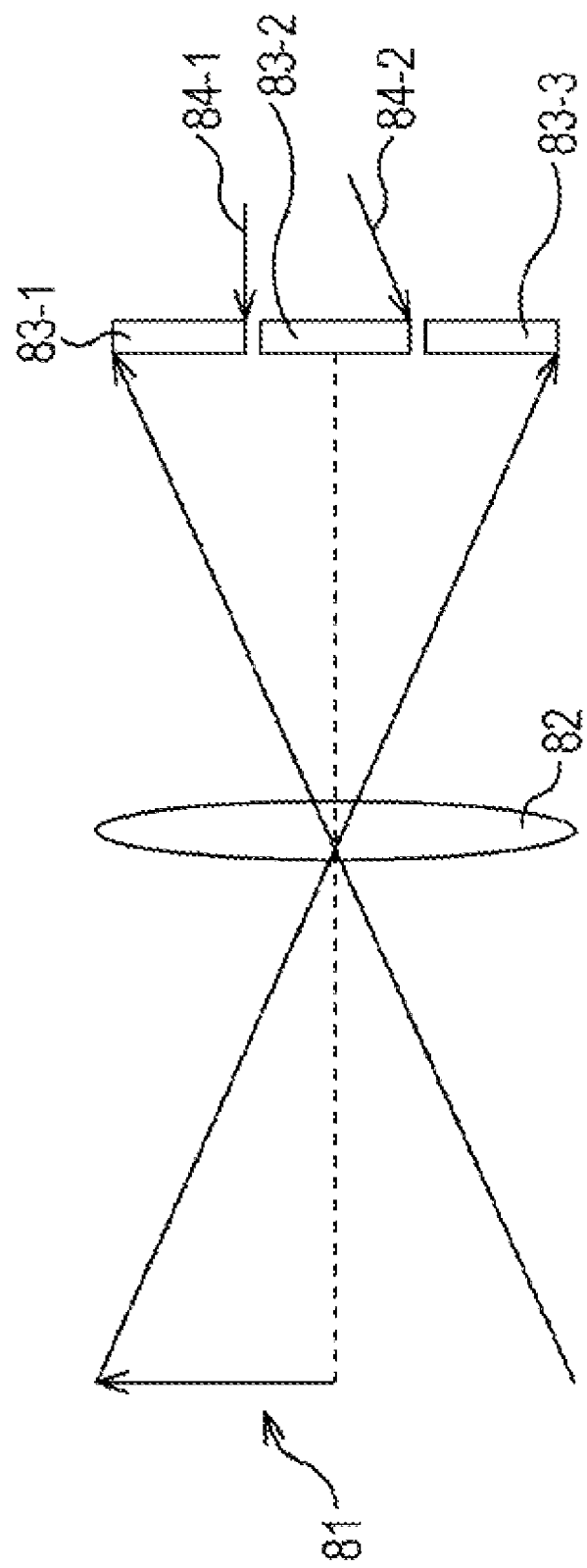
FIG. 3 is a diagram illustrating an optical system conceived on the basis of an existing method.

In addition, as described above, to address these drawbacks, a method shown in FIG. 3, for example, may be employed. That is, a plurality of CCD sensors, such as CCD sensors 83-1 to 83-3, are arranged in an array, and an image of an object 81 is formed on the plurality of CCD sensors arranged in an array. However, due to the physical sizes of the CCD sensors 33-1 to 83-3, frames of the CCD sensors interfere with each other. Therefore, a new problem arises in that areas 84-1 and 84-2 are generated between the CCD sensors where an image cannot be captured.

Furthermore, in the existing optical system described in Non-Patent Document 1, although a first image formation system and a second image formation system are present, an image in a border portion cannot be captured, since an image is separated by a prism into the second image formation system. Thus, the image is significantly distorted.

To solve these various problems, the present inventor invented a re-imaging (two-imaging) optical system shown in FIG. 2, that is, an optical system having a structure in which the first image formation system 41 and the second image formation system group 42 are provided and these two are connected via the field lens 43.

For example, the first image formation system includes an objective lens 51 to determine an optical characteristic relating to the angle of view of a CCD sensor. The first image formation system forms an image of an object plane 32 on the field lens 43 or in the vicinity of the field lens 43 once. That is, the field lens 43 is disposed at the focal point or in the vicinity of and in front of the focal point of the first image formation system. The second image formation system group 42 includes N second image formation systems, each including one zoom lens 61-K and a CCD sensor 62-K, where N is an integer greater than or equal to 2. Note that k is an integer between 1 and N. In the example shown in FIG. 2, k is any number between 1 and 3. The term "one zoom lens 61-K" does not mean that the zoom, lens 61-K includes only one lens, but means that the second image formation system group 42 includes the zoom lenses 62-1 to 62-N, each including at least one lens, and one of the second image formation systems includes a predetermined one of the zoom lenses 62-1 to 62-H.

In the second image formation system group 42 having such a structure, the CCD sensor 62-K can be disposed without interfering with the other CCD sensors. Accordingly, an image of the object plane 32 formed on the field lens 43 or in the vicinity of the field lens 43 can be formed on the surface of the CCD sensor 62-K again.

In the example shown in FIG. 2, the field lens 43 is employed. However, a diffuser (not shown) may be employed in place of the field lens 43. Note that, since a diffuser has a function of expanding the width (the beam angle) of an output beam, the resolution of an image is decreased.

In addition, in the second optical system in the example shown in FIG. 2, the CCD sensor 62-K is employed as an image pickup element, the type of image pickup element is not limited thereto. Any type of image pickup element can be used.

Figure 4:
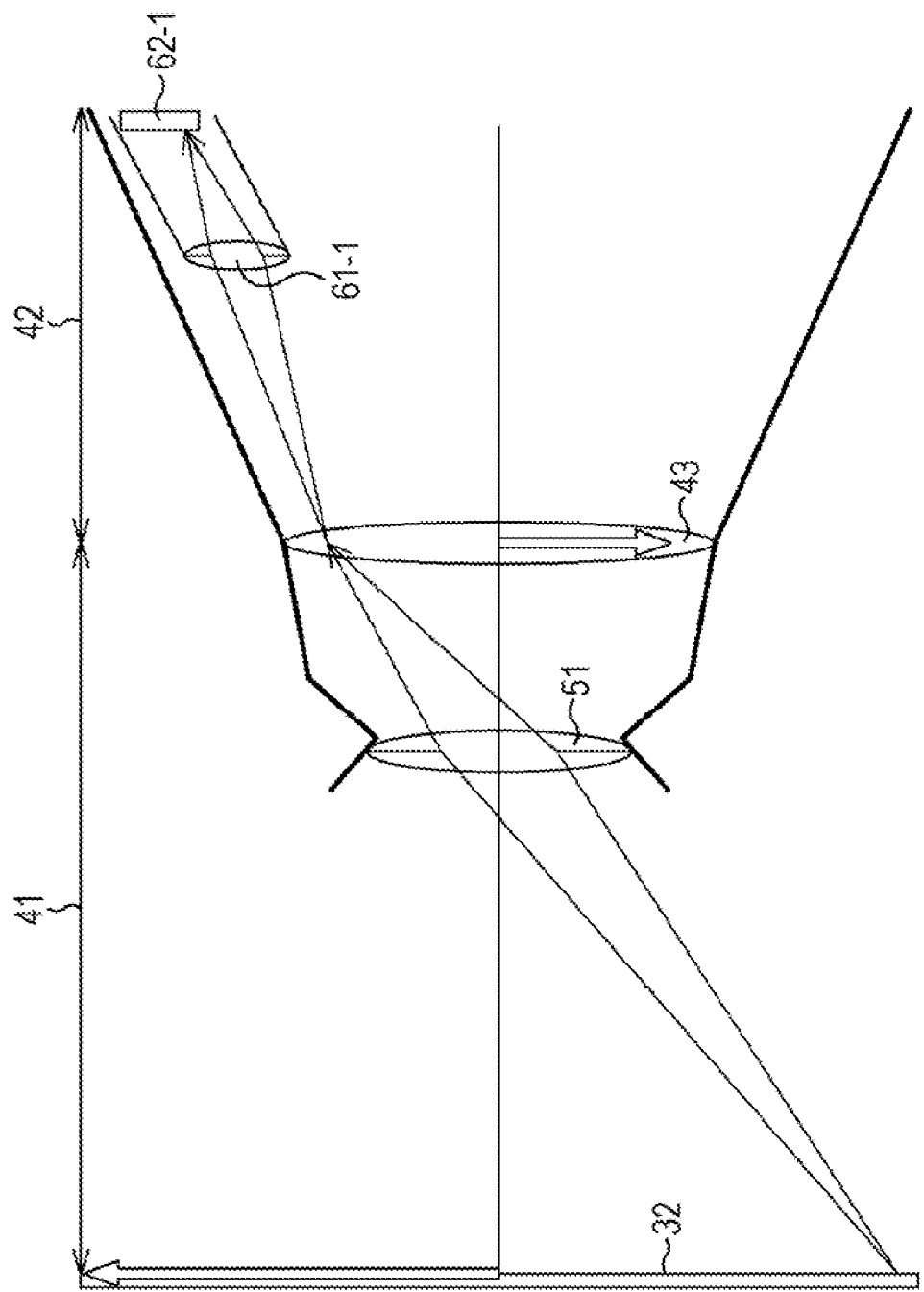
FIG. 4 is a diagram illustrating an exemplary structure of a second optical system different from that of the image pickup apparatus shown in FIG. 2 according to the present invention.

Furthermore, in the example shown in FIG. 2, the second optical system that is smaller than the field lens 43 is employed. However, the second optical system is not limited thereto. For example, as shown in FIG. 4, by decentering the position of the CCD sensor 62-K (note that only the CCD sensor 62-1 is shown in FIG. 4), a second optical system that is larger than the field lens 43 can be employed (disposed).

By employing the second image formation system group 42 having such a structure, highly flexible image capturing can be carried out. That is, since the number N of the CCD sensors 62-1 to CCD 62-H can be easily increased, highly flexible image capturing can be carried out. In addition, the position and amount of zoom of one of the second optical systems including the CCD sensor 62-K can be easily changed independently from the other second optical systems. Accordingly, for example, partial high-resolution image capturing can be easily performed. As a result, highly flexible image capturing can be carried out.

In particular, as described above, the known method in which an image is separated by a prism has a problem in that as the number of CCD sensors is increased, the number of required prisms is significantly increased. More specifically, when a prism for separating an image into four and four CCD sensors are used, one prism is sufficient. However, when sixteen CCD sensors are used, five prisms are required. Furthermore, when sixty-four CCD sensors are used, as many as twenty-one prisms are disadvantageously required. Furthermore, when the CCD sensors 1-1 to 1-4 are arranged using the method shown in FIG. 1, the imaging surface of the prism 2 is increased. Accordingly, it is difficult to process the prism 2, and therefore, the cost of the prism 2 is disadvantageously increased.

In contrast, in the second image formation system group 42 according to the present embodiment, a plurality of the CCD sensors 62-K can be arranged as far as the size of the lens, such as the zoom lens 61-K permits. For example, even when the size of the lens is increased, the lens can be produced at a cost lower than the cost required for processing a large prism. Consequently, according to the present embodiment, the entire optical system including the second image formation system group 42 can be produced at a low cost.

In addition, when an additional one of the CCD sensors 62-K is used, the need for a new design process of the optical path can be eliminated if the additional one is arranged so as not to change the focal length.

Figure 5:
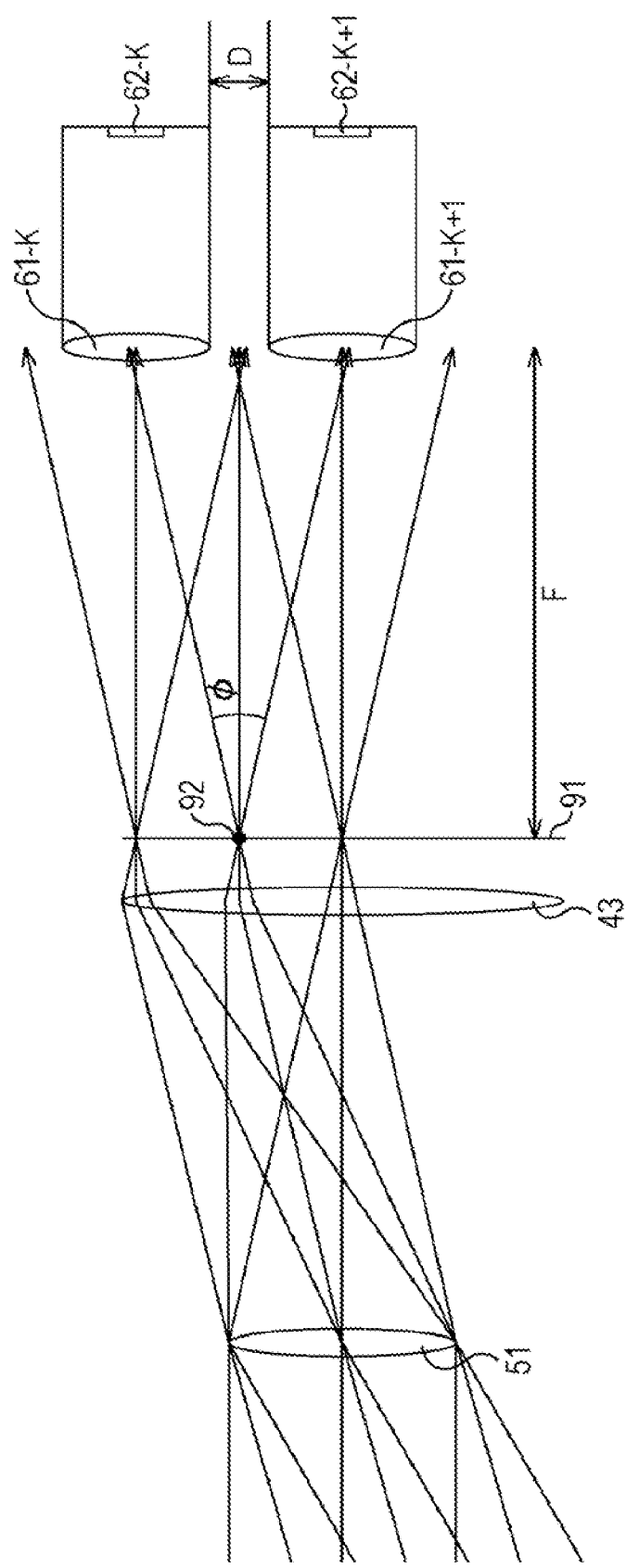
FIG. 5 is a diagram illustrating an example of a position at which the second optical system shown in FIG. 2 is disposed.

However, to maintain a blending region (e.g., the blending region 103 shown in FIG. 6, which is described below), two CCD sensors 62-K and 62-K+1 need to be disposed as shown in FIG. 5. That is, FIG. 5 is a diagram illustrating a method for arranging the two CCD sensors 62-K and 62-K+1.

In an example shown in FIG. 5, a plane 91 located in the vicinity of and on the right side of the field lens 43 serves as an imaging plane (an image formation plane). A region 92 in the plane 91 serves as a blending region. F denotes a distance between the imaging plane 91 and the zoom lens 61-K or a distance between the imaging plane 91 and the zoom lens 61-K+1. D denotes a distance between the two CCD sensors 62-K and 62-K+1. $\phi$ denotes the width (the beam angle) of a light beam corresponding to the blending region 92 among light beams output from the image formation plane.

In this case, to maintain the blending region 92, the light beam corresponding to the blending region 92 needs to be made incident on the two CCD sensors 62-K and 62-K+1, as shown in FIG. 5. To satisfy this condition, the following expression (1) needs to be satisfied:

$$2 \times F \times \tan(\phi/2) > D \qquad (1)$$

That is, by disposing the two CCD sensors 62-K and 62-K+1 with a distance D therebetween that satisfies the expression (1), a light beam corresponding to the blending region 92 is made incident on the two CCD sensors 62-K and 62-K+1. As a result, the blending region 92 can be maintained.

As noted above, by employing the second image formation system group 42, the number N of the CCD sensors 62-1 to 62-N can be easily increased. That is, if the two CCD 62-K and CCD 62-K+1 are disposed, so that the distance D therebetween satisfies the expression (1) to maintain the blending region, the arrangement can be flexibly and easily determined. As a result, highly flexible image capturing can be carried out.

In addition, according to the present embodiment, the second optical system includes a mechanism for shifting one CCD sensor 62-K in at least one of the horizontal and vertical directions (hereinafter referred to as a "shift mechanism") and a mechanism for zooming (hereinafter referred to as a "zoom mechanism"). The shift mechanism for the CCD sensor 62-K is driven by a position control actuator 78, which is described below, independently from the other CCD sensors. In addition, the zoom mechanism for the CCD sensor 62-K is driven by a zoom actuator 77 independently from the other CCD sensors.

Figure 6:
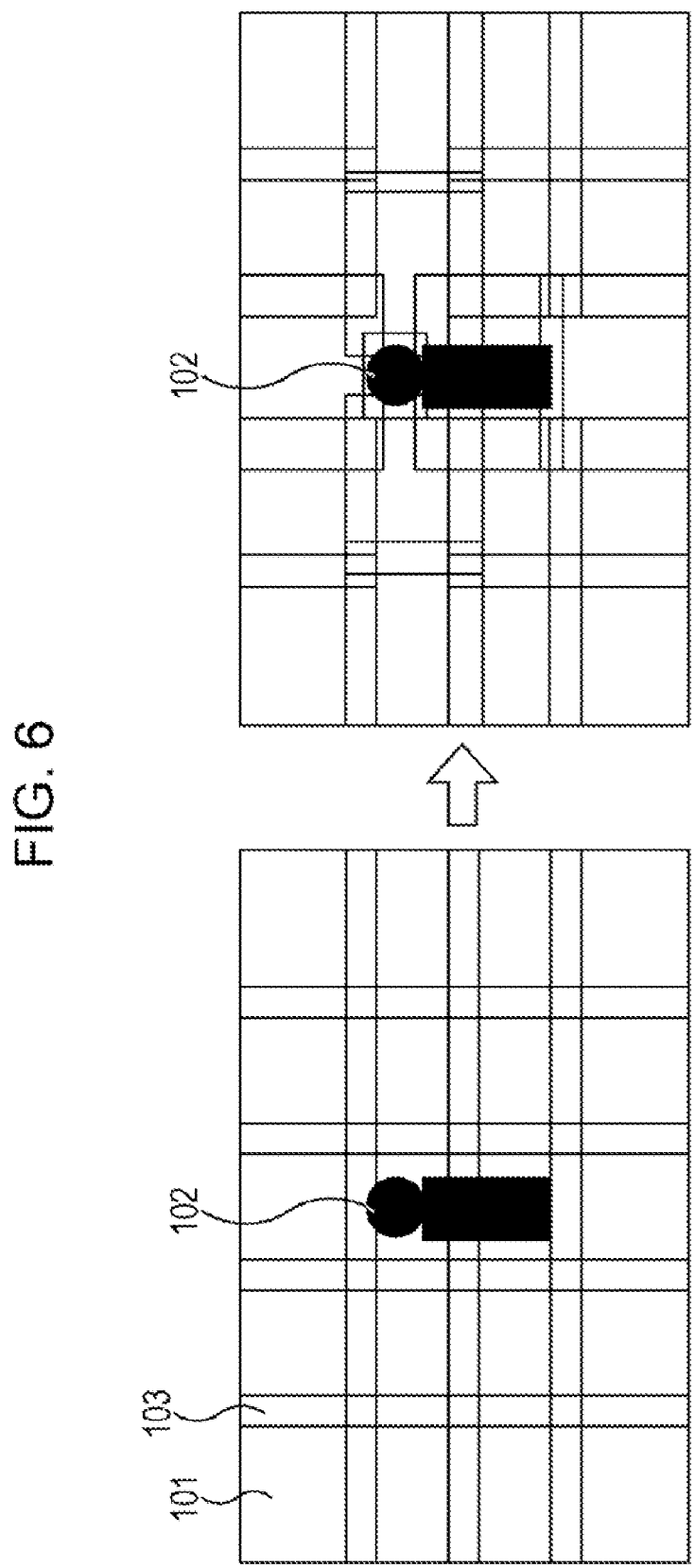
FIG. 6 is a diagram illustrating an image capturing operation in which a partial image of an object is captured in high resolution.

In this way, the density of arrangement of the CCD sensors 62-1 to 62-N and the imaging area of each of the CCD sensors 62-1 to 62-N can be easily changed. Accordingly, a partial high-resolution image can be captured. For example, as shown in FIG. 6, only the face of a human 102 can be captured in high resolution. That is, the left section of FIG. 6 illustrates image capturing of the human 102 in average image capturing. The term "average image capturing" refers to image capturing performed under the condition in which the CCD sensors 62-1 to 62-K are evenly disposed in an array with a distance of D therebetween and the zoom ratios for the CCD sensors 62-1 to 62-N are the same. In contrast, the right section of FIG. 6 illustrates image capturing in which only the image of the face of the human 102 (indicated by a circle) is captured in a high resolution. That is, let the object 32 shown in FIG. 2 denote the human 102. Then, only part (the face) of the object 32 is captured in a high resolution. In the two sections of FIG. 6, a square represents an angle of view 101 of the camera (the CCD sensor 62-K). Accordingly, an area where the angle of view 101 of one CCD sensor 62-K and the angle of view 101 of the CCD sensors 62-K+1 adjacent to the CCD sensors 62-K overlap serves as a blending region.

Figure 7:
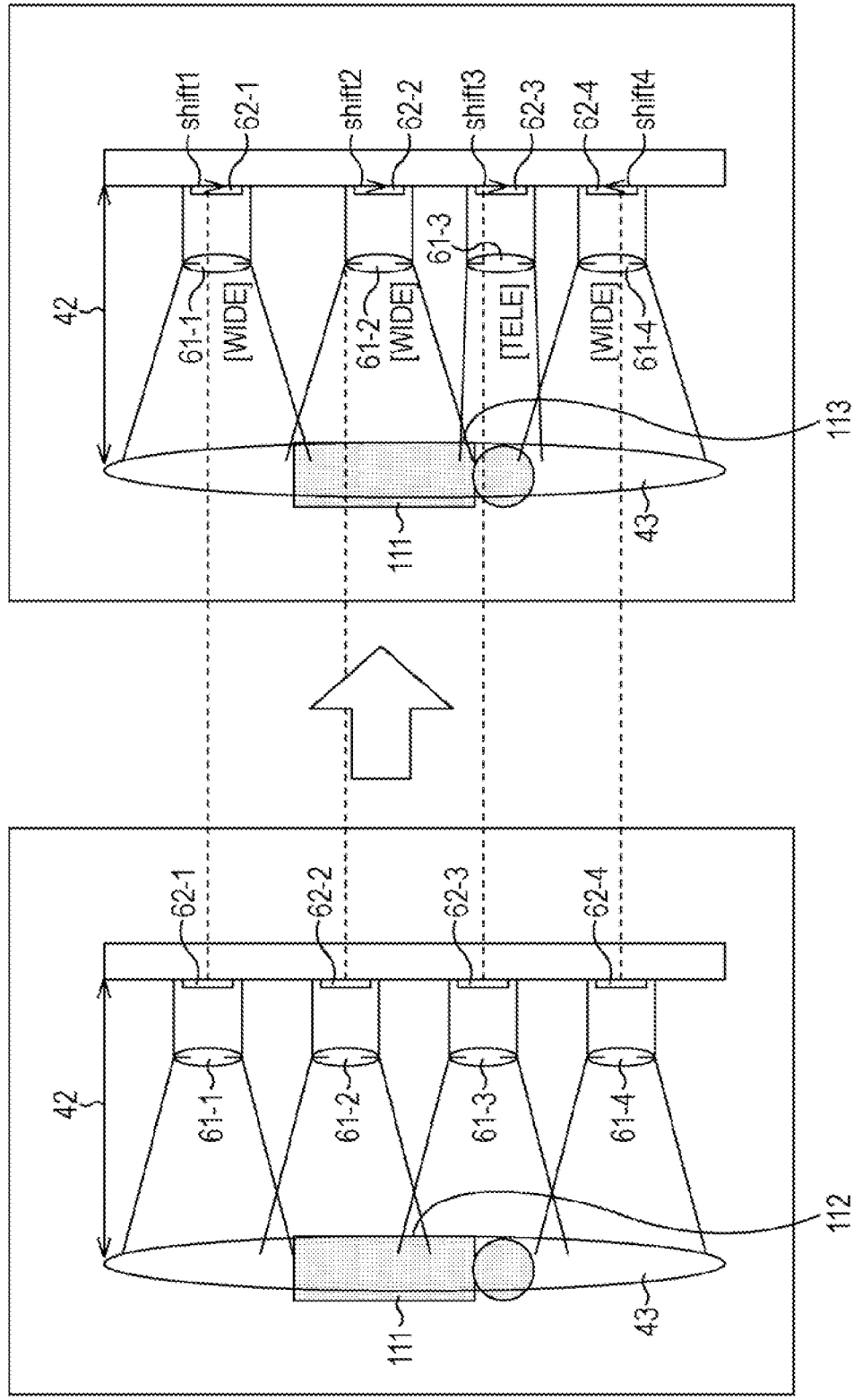
FIG. 7 is a diagram illustrating an exemplary operation of a second optical system group shown in FIG. 2 in the image capturing operation shown in FIG. 6.

FIG. 7 illustrates the operation of the second image formation system group 42 when an image is captured under the condition illustrated in FIG. 6. That is, the left-section of FIG. 7 illustrates the operation of the second image formation system group 42 when the average image capturing shown in the left section of FIG. 6 is carried out. In contrast, the right section of FIG. 7 illustrates the operation of the second image formation system group 42 when the image capturing shown in the right section of FIG. 6 is carried out, that is, when only the image of the face of the human 102 is captured in high resolution.

In the example shown in FIG. 7, only four second optical systems are sequentially arranged in the vertical direction. That is, only the second optical system including the CCD sensor 62-1 (hereinafter referred to as a "first second optical system"), the second optical system including the CCD sensor 62-2 (hereinafter referred to as a "second second optical system"), the second optical system including the CCD sensor 62-3 (hereinafter referred to as a "third second optical system"), and the second optical system including the CCD sensor 62-4 (hereinafter referred to as a "fourth second optical system") are shown. In addition, in each of the two sections of FIG. 7, an image 111 of the human 102 shown in FIG. 6 is formed at the same position in the field lens 43. Furthermore, each of areas 112 and 113 of the image 111 forms a blending region.

As can be seen from comparison between the two sections of FIG. 7, when image capturing shown in the right section of FIG. 6 is carried out, that is, when the image of only the face of the human 102 is captured in high resolution, a "WIDE" (wide-angle) zoom operation of the first second optical system is carried out by the zoom mechanism thereof and a shift1 operation of shifting the first second optical system in a downward direction in the drawing is carried out by the shift mechanism thereof. Similarly, a "WIDE" zoom operation of the second optical system is carried out by the zoom mechanism thereof and a shift2 operation of shifting the second optical system in a downward direction in the drawing is carried out by the shift mechanism thereof. A "TELE" (telephoto) zoom operation of the third second optical system is carried out by the zoom mechanism thereof and a shift3 operation of shifting the third second optical system in a downward direction in the drawing is carried out by the shift mechanism thereof. A "WIDE" zoom operation of the fourth second optical system is carried out by the zoom mechanism thereof and a shift4 operation of shifting the first second optical system in an upward direction in the drawing is carried out by the shirt mechanism thereof.

In this way, according to the present embodiment, the position shift operation and one of "WIDE" and "TELE" zoom operations are carried out for each of the second image formation systems 42 of the second image formation system group 42. Thus, the position change and zooming of the second optical system including the CCD sensors 62-K can be carried out independently from the other second optical systems. As a result, partially high-resolution image capturing can be easily carried out, and therefore, highly flexible image capturing can be carried out.

In the case of partially high-resolution image capturing with a constant angle of view, when some of the second optical systems carry out a "TELE" zoom operation, the other second optical systems carry out a "WIDE" zoom operation. Accordingly, a portion of the image captured by the second optical systems in the "TELE" zoom mode is nigh resolution. However, the resolution in a portion around the high-resolution portion, that is, the resolution in a portion captured by the other second optical systems in the "WIDE" zoom mode slightly deteriorates.

However, in general, a user (photographer) does not need the entirety of the image capturing area (i.e., the area of an image formed on the field lens 43 or in the vicinity of the field lens 43), but only needs some of the image capturing area for viewing. In such a case, it is sufficient for many users that only the area that the user wants to view is high resolution. Most of the users allow the other area not to be high resolution.

To satisfy such a user requirement, the user needs to select an area that the user wants to view, that is, an area where the image is to be captured in high resolution (hereinafter referred to as a "high-resolution image capturing range"). A method for selecting a high-resolution image capturing range is not limited to a particular one. For example, the following first or second method can be employed.

In the first selection method, a user specifies a desired area of an image using the high-resolution image capturing range selection interface 45 shown in FIG. 2 and, subsequently, a high-resolution image capturing range computing circuit 76 selects the specified area as a high-resolution image capturing range.

In the second selection method, the high-resolution image capturing range computing circuit 76 computes the frequencies in the image and increases the resolution of only an area having a high frequency (i.e., selects an area having a high frequency as a high-resolution image capturing range).

To combine an image in a high-resolution image capturing range captured by at least one of the CCD sensors 62-1 to 62-N with an image in a low-resolution range captured by the other CCD sensors into one image (frame), the images in the other ranges need to be expanded so as to match the high-resolution image capturing range. Subsequently, the image in the high-resolution image capturing range needs to be connected together to the images in the other areas in the blending region. Hereinafter, such a process is referred to as a "blending process". The blending process is described in more detail below with reference to FIG. 18 and others.

So far, the optical system including the first image formation system 41 (the first optical system 41), the second image formation system group 42 (the second optical system group 42), and the field lens 43, which are components of the image pickup apparatus 31 shown in FIG. 2, has been described. In the description above, the high-resolution image capturing range selection interface 45 is an interface used in the above-described first selection method.

The signal processing unit 44, which is the last component of the image pickup apparatus 31 shown in FIG. 2, is described next.

In the example shown in FIG. 2, the signal processing unit 44 includes components from a memory 71-1 to the position control actuator 78.

Since the components from the high-resolution image capturing range computing circuit 76 to the position control actuator 78 have been described above, descriptions are not repeated.

The memories 71-1 to 71-3 store image signals output from the CCD sensors 62-1 to 62-3, respectively. That is, in the example shown in FIG. 2, only three CCD sensors 62-1 to 62-3 are shown. Accordingly, only three memories 71-1 to 71-3 are shown. Consequently, in practice, N memories 71-1 to 71-N are provided for N CCD sensors 62-1 to 62-N, respectively.

According to the present embodiment, the distortion parameters of the first image formation system 41 and the second image formation system group 42 of the image pickup apparatus 31 in the example shown in FIG. 2 are different. Accordingly, to correct the distortion, components from a phase detection/correction circuit 72 to a luminance correction information memory 75 are provided.

As an example of a method for correcting the distortion using the components from the phase detection/correction circuit 72 to the luminance correction information memory 75 in a simple manner, a method for automatically correcting the phase and the luminance using a test pattern is described below. That is, a method is described below in which the image of a test pattern (described below) is captured using several parameters in advance and, subsequently, phase correction information and luminance correction information are automatically extracted. In addition, a method is described below in which, when an image of an object is captured, the phase and the luminance of the image of the object is corrected in real time using the phase correction information and the luminance correction information.

A method for extracting the luminance correction information and a method for correcting the luminance ha method for applying the luminance correction information) in a luminance detection/correction circuit 74 are described first.

When an image is captured, the luminance detection/correction circuit 74 can perform mapping in real time using luminance correction information stored in the luminance correction information memory 75 and, in particular, using, for example, luminance correction information shown in FIG. 8.

In this case, the luminance correction information needs to foe generated (extracted) in advance and needs to be stored in the luminance correction information memory 75 in advance. According to the present embodiment, the luminance detection/correction circuit 74 extracts the luminance correction information in advance and stores the luminance correction information in the luminance correction information memory 75 in advance. A method for extracting luminance correction information in the luminance detection/correction circuit 74 in advance, that is, a method for extracting luminance correction information is described below.

The method for extracting luminance correction information includes the following series of processes.

That is, the luminance detection/correction circuit 74 captures an image of an all white wall first. Subsequently, the luminance detection/correction circuit 74 extracts a curved surface of the luminance values of the image as a correction parameter.

More specifically, in the image (frame) of an all white wall, a luminance value at any point of the image should be the same. However, in practice, the luminance value at the center of the image is generally the highest (i.e., the center of the image is the brightest), and the luminance value is decreased towards the periphery of the image (i.e., the image becomes darker towards the periphery thereof). Accordingly, the distribution of the luminance of the image can be expressed by a function of a curved surface Six, y). For example, a general expression of the curved surface $S(x, y)$ is expressed as follows:

$$S(x, y) = b1 \cdot (x-b2)^2 + b3 \cdot (y-b4)^2 + b5 \cdot x \cdot y + b6 \quad (2)$$

In equation (2), b1 to b6 denote parameters (coefficients), x and y denote coordinates in XY coordinate system when, in a plane in which the CCD sensors 62-1 to 62-N are arranged in an array, the horizontal direction is defined as an X direction and the vertical direction is defined as a Y direction. Hereinafter, such an XY coordinate system is also referred to as an "absolute coordinate system", and the coordinates of the XY coordinate system are also referred to as "absolute coordinates".

Accordingly, when the position of the CCD sensor 62-K is represented by (u, v) in an absolute coordinate system, the coefficients b1 to b6 for luminance correction are uniquely determined by the position of the CCD sensor 62-K (the position (u, v) of one second optical system) and a zoom ratio r.

Figure 9:
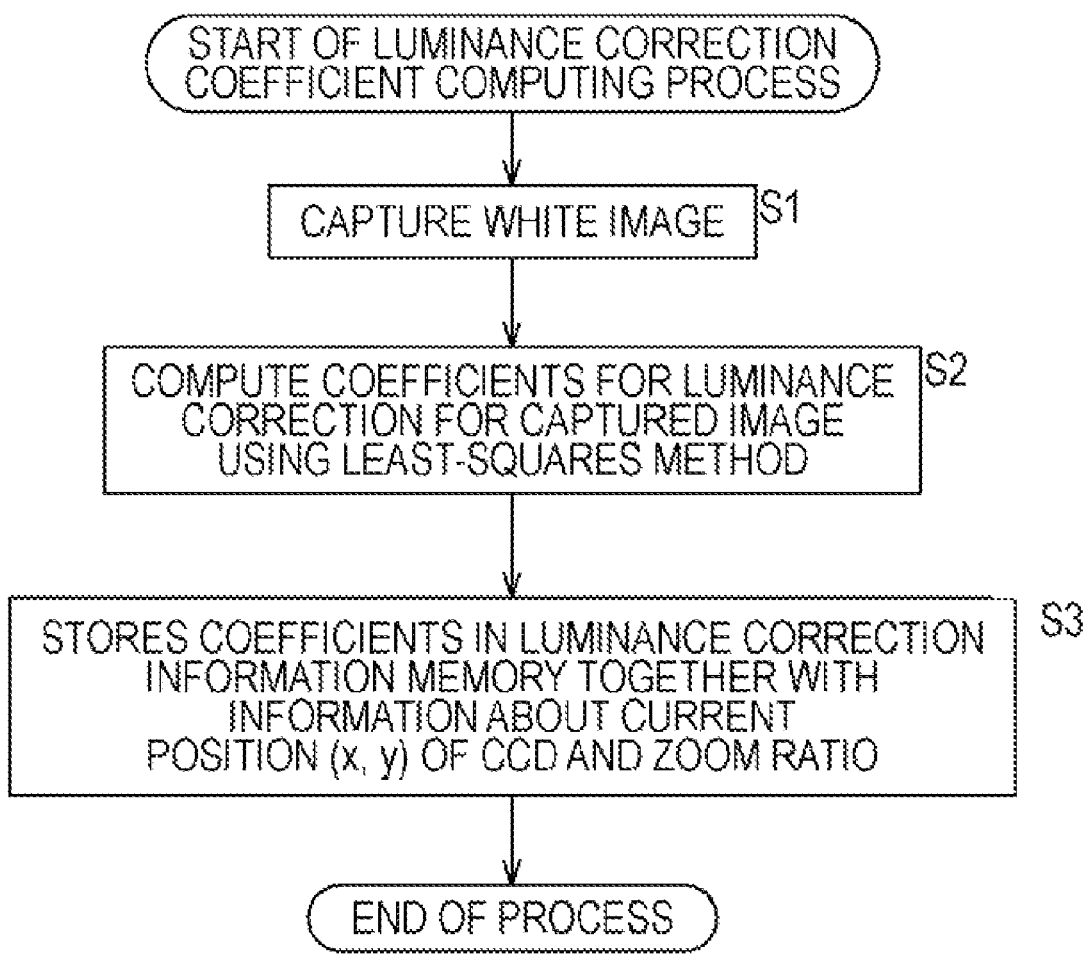
FIG. 9 is a flow chart illustrating an example of computation of a coefficient for luminance correction.

Therefore, the luminance detection/correction circuit 74 computes the coefficients b1 to b6 for luminance correction in accordance with, for example, a flow chart shown in FIG. 9. That is, FIG. 9 illustrates an example of computation of a coefficient for luminance correction performed by the luminance detection/correction circuit 74. Hereinafter, this computation is referred to as a "luminance correction coefficient computing process".

At step S1, the image pickup apparatus 31 including the luminance detection/correction circuit 74 captures an image of an all white wall, that is, an image of an all white test pattern. At that time, the position (u, v) and the zoom ratio r of a predetermined CCD sensor 62-K are appropriately determined.

At step 32, the luminance detection/correction circuit 74 computes the coefficients (parameters) b1 to be for luminance correction in equation (2) using the position (u, v) and the zoom ratio r of the CCD sensor 62-K used in the image capturing process at step S1 and the luminance value of an image output from the CCD sensor 62-K (i.e., a partial image of the all white wail) and using, for example, the least-squares method.

At step S3, the luminance detection/correction circuit 74 stores a coefficient group LOT including the coefficients (parameters) b1 to b6 in the luminance correction information memory 75 together with the current position (u, v) and the zoom ratio r of the CCD sensor 62-K.

Thus, the luminance correction coefficient computing process has been completed. As a result, the data of the radius of the curvature for the position (u, v) and the zoom ratio r can be obtained.

The above-described luminance correction coefficient computing process is carried out for each of several patterns of the position (u, v) and the zoom ratio r. In this way, the above-described luminance correction information, as shown in FIG. 8, can be acquired. The luminance correction information is stored in the luminance correction information memory 75.

The method for correcting the luminance (the method for using the luminance correction information) is described next.

Figure 10:
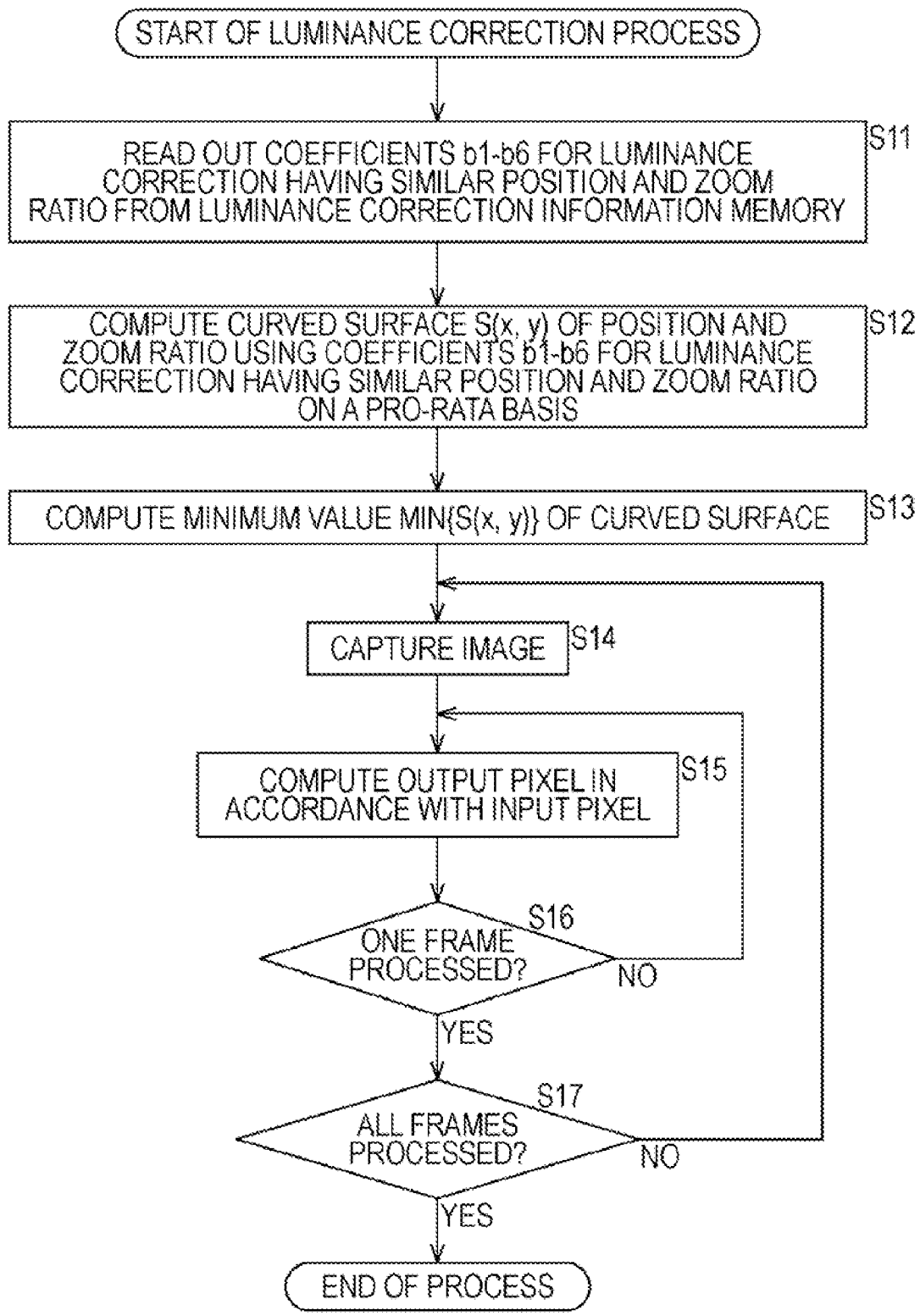
FIG. 10 is a flow chart illustrating an example of a luminance correction process.

FIG. 10 is a flow chart illustrating an example of a process corresponding to the method for correcting the luminance (hereinafter referred to as a "luminance correction process"). The luminance correction process is described next with reference to FIG. 10, At step S11, the luminance detection/correction circuit 74 selects a predetermined CCD sensor 62-K and reads out at least one of groups of the coefficients b1 to b6 for luminance correction (i.e., at least one of the coefficient groups LOT) that has a position and a zoom ratio close to the current ones from the luminance correction information memory 75. For example, when the current position of the CCD sensor 62-K (u, v) is (0.5, 1) and the zoom ratio is 1.05, the coefficients b1 to b6 for luminance correction that have a position and a zoom ratio close to the current ones represent those in the first row or the second row of the luminance correction information shown in FIG. 8. That is, in this case, when the current position (u, v) of the CCD sensor 62-K is (0, 0) and the zoom ratio is 1.1, the coefficients b1 to b6 (the coefficient group LOT) computed in the luminance correction coefficient computing process shown in FIG. 9 are read out from the luminance correction information memory 75 at step S11. Alternatively, when the current position (u, v) of the CCD sensor 62-K is (1, 2) and the zoom ratio is 1.2, the coefficients b1 to b6 (the coefficient, group LUT) computed in the luminance correction coefficient computing process shown in FIG. 9 are read out from the luminance correction information memory 75 at step 311.

At step S12, the luminance detection/correction circuit 74 computes the curved surface $S(x, y)$ corresponding to the position and the zoom ratio on a pro-rata basis using the coefficients b1 to b6 for luminance correction that have a position and a zoom ratio close to the current ones. That is, the luminance detection/correction circuit 74 computes virtual coefficients b1 to b6 by linearly interpolating several sets of the coefficient groups having a position and a zoom ratio close to the current ones. Thereafter, the luminance detection/correction circuit 74 computes the luminance correction curved surface $S(x, y)$ by substituting the virtual coefficients b1 to be into equation (2).

At step S13, the luminance detection/correction circuit 74 computes a minimum value $MIN\{S(x, y)\}$ of the virtual luminance correction curved surface $S(x, y)$ computed at step S12.

At step S14, the image pickup apparatus 31 including the luminance detection/correction circuit 74 captures an image of the object. Thus, all the pixels of the frame, that is, input luminance values (pixel values) $IN(x, y)$ of the pixels of the images output from the CCD sensors 62-1 to 62-N are input to the luminance detection/correction circuit 74. Subsequently, the process proceeds to step S15.

Hereinafter, the input luminance value (pixel value) $IN(x, y)$ of a pixel is referred to as an "input pixel $IN(x, y)$". Also, the luminance value (pixel value) $OUT(x, y)$ of the pixel output from the luminance detection/correction circuit 74 is referred to as an "output pixel $OUT(x, y)$".

In addition, hereinafter, a target frame to be processed, that is, a frame captured in the process of step S14 is referred to as a "frame of interest".

At step 315, the luminance detection/correction circuit 74 sets a predetermined one of input pixels $IN(x, y)$ of a frame of interest to be an input pixel $IN(x, y)$ of interest. Thereafter, the luminance detection/correction circuit 74 computes an output pixel $OUT(x, y)$ of interest in accordance with the input pixel $IN(x, y)$ of interest. That is, the luminance detection/correction circuit 74 corrects the input pixel $IN(x, y)$ of interest by computing the right-hand side of the following equation (3) so as to obtain the output pixel $OUT(x, y)$ of interest, which is the result of the correction.

$$OUT(x, y)=IN(x, y) \cdot MINS(x, y)/S(x, y) \quad (3)$$

At step S16, the luminance detection/correction circuit 74 determines whether this process is completed for all the pixels of a frame of interest.

If, at step S16, it is determined that the process has not been completed for all the pixels of a frame of interest, the process returns to step S15 and the subsequent, processes are repeated.

That is, a loop consisting of steps S15 and S16 is repeatedly executed until the output pixels $OUT(x, y)$ are obtained for all the pixels of the frame of interest. As a result of the computation, the frame of interest including these output pixels $OUT(x, y)$ is output from the luminance detection/correction circuit 74 as at least part of an image signal.

Subsequently, it is determined at step S16 that the process has been completed for all the pixels of the frame of interest, and therefore, the process proceeds to step S17.

At step S17, the luminance detection/correction circuit 14 determines whether image capturing for all the frames has been completed (i.e., whether a user has instructed the completion of image capturing).

If, at step S17, it is determined that image capturing for all the frames has not been completed (i.e., a user has not instructed the completion of image capturing), the process returns to step S14 and the subsequent processes are repeated, That is, the next frame captured at the next step S14 becomes a frame of interest, and a loop consisting of seeps S15 and S16 is repeatedly executed until the output pixels $OUT(x, y)$ are obtained for all the pixels of the frame of interest (i.e., the next frame). As a result of the computation, the frame of interest including these output pixels $OUT(x, y)$ is output from, the luminance detection/correction circuit 74 as at least part of an image signal.

Subsequently, if, at step S17, it is determined that image capturing has been completed for all the frames (i.e., the user has instructed the completion of image capturing), the luminance correction process has been completed.

So far, the method for extracting luminance correction information in the luminance detection/correction circuit 74 and the method for correcting the luminance (and using the luminance) have been described.

A method for extracting the phase correction information and a method for correcting the phase (a method for using the phase correction information) in the phase detection/correction circuit 72 is described next.

When an image is captured, the phase detection/correction circuit 72 can perform mapping in real time using the phase correction information stored in a phase correction information memory 73.

At that time, the phase correction information needs to be generated (extracted) and stored in the phase correction information memory 73 in advance. Therefore, according to the present embodiment, the phase detection/correction circuit 72 can extract the phase correction information in advance and can store the phase correction information in the phase correction information memory 73 in advance. A method for extracting the phase correction information performed by the phase detection/correction circuit 72 in advance, that is, a method for extracting phase correction information is described below.

The method for extracting phase correction information includes the following series of processes.

That is, the phase detection/correction circuit 72 captures an image of a predetermined test pattern first. Thereafter, the phase detection/correction circuit 72 extracts, from an image having some angle of view in the captured image (a partial image captured by a predetermined CCD sensor 62-K), the absolute coordinates of an image of the angle of view (CCD sensor 62-K). The absolute coordinates serve as a correction parameter. For example, the test pattern is an image including a plurality of blocks, each being painted with a predetermined color independent from colors of neighboring blocks. In most cases, the colors of neighboring blocks are different. However, in some cases, the colors of neighboring blocks are the same.

The test pattern needs to uniquely indicate the coordinates and the zoom ratio corresponding to a predetermined angle of view (a predetermined CCD sensor 62-K) when it is captured. In addition, since all the blocks of the test pattern are not contained in the angle of view of one camera (the CCD sensor 62-K), it is desirable that the position of the CCD sensor 62-K that captured the image of the block can be identified by referencing blocks immediately above, below, and to the left and right of the block.

Accordingly, an exemplary method for generating such a test pattern (image data) is described below with reference to FIGS. 11 to 13.

As described above, the test, pattern is used for extracting, from an image having some angle of view in the captured test pattern image (a partial image captured by a predetermined CCD sensor 62-K), the absolute coordinates of the angle of view (the CCD sensor 62-K) as a correction parameter. Accordingly, the test pattern needs to uniquely indicate the coordinates of the predetermined angle of view (the predetermined CCD sensor 62-K) and the zoom ratio when it is captured.

According to the present embodiment, each block is encoded using an encoding method that enables the absolute position of the block of interest to be identified using a difference between a code V of a predetermined block (hereinafter referred to as a "block of interest") of the blocks of the test pattern and a code V of a block adjacent to the block in the upward-downward direction or in the left-right direction. A specific example of the encoding method is described later with reference to FIG. 12.

In such a case, by associating a code V with a color in advance and, for example, displaying the blocks with the colors associated with the code V of the blocks using a predetermined display unit, the test pattern can be displayed (generated).

More specifically, for example, seven (R, G, B) pattern colors, which are colors of the blocks of a test pattern, are associated with seven codes (a value between 0 and 6) indicated by "CODE", as shown in FIG. 11. That is, the value of the "CODE" could be the code V of each block. For example, when the code V of the block of interest among the blocks of the test pattern is 0, the block of interest is displayed with a pattern color (R, G, B)=(0, 0, 1), that is, blue.

In an example of FIG. 11, the number of color patterns is seven. However, the number of color patterns is not limited thereto, but any number of patterns may be used. That is, for example, a greater number of pattern colors may be defined by using the gradation of RGB. However, the use of the gradation of RGB increases an error caused by the above-described distortion of the luminance. Accordingly, if too many pattern colors are defined and the image of the test, pattern is captured by the image pickup apparatus shown in FIG. 2, the color of the block of interest of the captured test pattern or the color of a block adjacent to the block of interest cannot be identified. To address this issue, it is desirable that the number of the color patterns is determined by the combinations of the presence or absence (1 or 0) of each color of RGB, that is, the number of the color patterns is about eight, as shown in the example of FIG. 11. However, in the example of FIG. 11, the pattern color (R, G, B)=(0, 0, 0) is excluded, and therefore, the number of the color patterns is seven. This is because, when (R, G, B)=(0, 0, 0), the apparatus cannot determine whether the color indicates a block outside the angle of view or a block of the pattern color (0, 0, 0).

As described above, when seven pattern colors shown in FIG. 11 is used, that is, when only one of the value between 0 and 6 is used for the code V, the apparatus can encode each block by using, for example, the encoding method shown in FIG. 12. That is, FIG. 12 illustrates an example of an encoding method, in which the absolute position of the block of interest is identified using a difference between the code V of the block of interest and the code V of a block adjacent to the block of interest in the up-down direction or in the left-right direction.

In an XY plane shown in FIG. 12, the right direction of the test pattern is defined as an X direction, the downward direction of the test pattern is defined as a Y direction, and the coordinates of the upper left corner of the test pattern is defined as (0, 0). In the X direction, the length of a side of each block of the test pattern is defined as 1. In the Y direction, the length of a side of each block of the test pattern is defined as 1. Hereinafter, such a XY coordinate system is referred to as a "test pattern coordinate system". In this case, in the test pattern coordinate system, (U, V) represents the coordinates of the upper left corner of the block that is a Uth block from the left and a Vth block from the top. Hereinafter, in the test pattern coordinate system, the coordinates of the upper left corner of a predetermined block is simply referred to as "coordinates of a predetermined block".

Under such definitions, in FIG. 12, a value X represents the X coordinate or Y coordinate of the block of interest in this test pattern coordinate system. In addition, a difference code Y1 represents a difference value between a code V of the block of interest and a code V of a predetermined block among the blocks immediately above, below, and to the left and right of the block of interest. Furthermore, if the computed difference code Y1 is negative, +7 is added to the negative value. The resultant value becomes a new difference code Y1. In the left and right directions, the code V of the left block is subtracted from the code V of the right block. In the upward and downward directions, the code V of the upper block is subtracted from the code V of the lower block.

That is, for example, when the coordinates of the block of interest is (3, 1), the X coordinate of the block of interest is 3. Accordingly, when looking at an entry having the value X=3 in FIG. 12, the difference code Y1 in an entry to the right of the entry is 3. The difference code Y1 in an entry immediately above the entry is 2. This indicates that a first difference (a first difference code Y1) between the code V of the block of interest and the code V of the block immediately on the left of the block of interest and a second difference (a second difference code Y1) between the code V of the block of interest and the code V of the block immediately on the right of the block of interest form a set of 2 and 3. That is, a rule indicating that the block of interest having an X coordinate of 3 should be encoded so that a set of the first difference code Y1 and the second difference code Y1 form a set of 2 and 3 is defined in FIG. 12.

Similarly, when the coordinates of the block of interest is (3, 1), the Y coordinate of the block of interest is 1. Accordingly, in FIG. 12, since the value X=1, the difference code Y1 on the lower side is 1 and the difference code Y1 in the upper entry is 0. This indicates that a third difference (a third difference code Y1) between the code V of the block of interest and the code V of the block immediately on the upper side of the block of interest and a fourth difference (a fourth difference code Y1) between the code V of the block of interest and the code V of the block immediately on the lower side of the block of interest form a set of 0 and 1. That is, a rule indicating that the block of interest having a Y coordinate of 1 should be encoded so that a set of the third difference code Y1 and the fourth difference code Y1 form a set of 0 and 1 is defined in FIG. 12.

That is, a rule indicating that a block of interest having the coordinates (3, 1) should be encoded so that a set of the first difference code Y1 and the second difference code Y1 is a set of 2 and 3 and a set of the third difference code Y1 and the fourth difference code Y1 is a set of 0 and 1 is defined in FIG. 12.

In FIG. 12, the entries for a difference and a sum are provided to create the rule in FIG. 12 so that the two sets concerning the difference code Y1 are not duplicated (a plurality of the two sets are not created). These entries are not used for an actual encoding or decoding process. That is, the entries for a difference and a sum are provided in order to determine the next difference code Y1 on the basis of the previously determined difference code Y1 (the difference code Y1 in the upper entry in FIG. 12).

More specifically, in the entry of "difference", a value that could be a difference between two difference codes Y1 is included. That is, in this case, since the code V is one of values between 0 and 6, a difference between two difference codes Y1 is one of values between 1 and 6. Note that a difference between two difference codes Y1 of 0 means that the two difference codes Y1 are equal. It follows that the value 0 is excluded. In addition, when considering a predetermined one of values between 1 and 6 of two difference codes Y1, there are severs sets of the two difference codes Y1. Accordingly, in the entries of "difference" shown in FIG. 12, seven "1"s are written from the top and, subsequently, seven "2"s are written, similarly, seven "3"s to seven "6"s are subsequently written.

In the entry of "difference", the sum of the sum value in an entry immediately above the entry and the difference value in an entry to the left of the entry is written. More specifically, for example, a first difference code Y1 bin the upper left section in FIG. 12) is 0. In this case, the sum in an entry to the left of the entry (a first sum) is 0. Accordingly, a sum 1 of the first, sum 0 and the difference 1 in an entry to the left of the entry is written as a second sum. The sum value of 1 is determined as the value of the difference code Y1 in an entry to the right of the entry. That is, when the sum value is expressed in septenary, the value in the least significant digit is the difference code Y1 in the entry to the right thereof. For example, when the sum value is 7, the difference code Y1 is 0. When the sum value is 9, the difference code Y1 is 2.

According to the determination rule of the difference code Y1, that is, the above-described rule in which the difference code Y1 is determined using the entries of the difference and the sum, the value X can range from 0 to 43, as shown in FIG. 12. This means that the value X in the range from 0 to 43 can be encoded using the difference code Y1. In other words, in the test pattern coordinate system, a test pattern having the X coordinate and Y coordinate, each in the range from 0 to 43, that is, a test pattern capable of having 44 blocks in the upward-downward direction and 44 blocks in the left-right direction (hereinafter, such a size is written as "44×44") can be generated.

Accordingly, by performing the encoding process according to the encoding method using the difference code Y1 shown in FIG. 12, the apparatus can generate image data for a 44×44 test pattern, that is, image data including the codes V of 44×44 blocks.

Figures 13, 14:
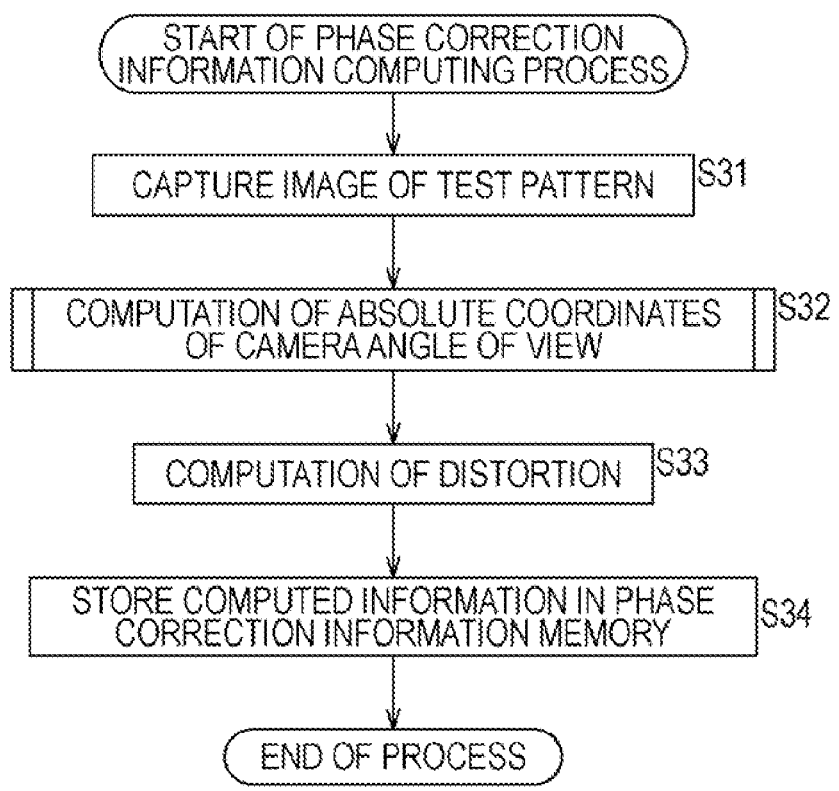
FIG. 13 is a diagram illustrating an example of a test pattern for phase correction.
FIG. 14 is a flow chart illustrating an example of computation of phase correction information.

More specifically, for example, image data for a test pattern shown in FIG. 13 is generated. That is, FIG. 13 illustrates an example of the image data of a test pattern. In FIG. 13, a square represents a block. In the upper section of the block, the coordinates (U, V) of the block in the test pattern coordinate system is written as "U-V". In the lower section of the block, the code V of the block is written.

For example, when a block having coordinates (3, 1) (indicated by "3-1" in the drawing) is defined as a block of interest, the code V of the block is 3. That is, since the code V of a block immediately to the left of the block of interest (indicated by "2-1" in the drawing) is 1, a difference between the code V of the block of interest and the code V of a block immediately to the left of the block of interest, that is, a first difference code Y1 is 2 (=3−1). In addition, since the code V of a block immediately to the right of the block of interest (indicated by "4-1" in the drawing) is 6, a difference between the code V of the block immediately to the right of the block of interest and the code V of the block of interest, that is, a second difference code Y1 is 3 (=6−3). Similarly, since the code V of a block immediately above the block of interest (indicated by "3-0" in the drawing) is 3, a difference between the code V of the block of interest and the code V of the block immediately above the block of interest, that is, a third difference code Y1 is 0 (=3−3). In addition, since the code V of a block immediately below the block of interest (indicated by "3-2" in the drawing) is 4, a difference between the code V of the block immediately below the block of interest and the code V of the block of interest, that is, a fourth difference code Y1 is 1 (=4−3). Thus, the block of interest having the coordinates (3, 1) is encoded in accordance with the rule (i.e., an encoding method) shown in FIG. 12 in which a set of the first difference code Y1 and the second difference code Y1 forms a set of 2 and 3 and a set of the third difference code Y1 and the fourth difference code Y1 forms a set of 0 and 1. As a result, the code V of 3 is obtained.

Note that, when a block having coordinates (3, 3) is defined as a block of interest, a difference between the code V of a block immediately to the right of the block of interest (indicated by "4-3" in the drawing) and the code V of the block of interest is a negative value of −4 (=2−6). If the difference is a negative value, +7 is added to the difference, as described, above. That is, the resultant, value 3 (=−4+7) becomes the second difference code Y1.

Thereafter, the apparatus paints each block a pattern color (see FIG. 11) corresponding to the code V of the block so as to generate a test pattern. More specifically, for example, in an example shown in FIG. 13, a block having coordinates (0, 0) is given a pattern, color of (R, G, B)=(0, 0, 1) corresponding to the code V=0, that is, blue. A block having coordinates (2, 0) is given a pattern color of (R, G, B)=(0, 1, 0) corresponding to the code V=1, that is, green. Such an operation is repeated for all the 44×44 blocks. As a result, a 44×44 test pattern is generated. As used herein, the term "paint" refers to an operation of printing the corresponding pattern colors on, for example, a paper medium or an operation of displaying the corresponding pattern colors on a display unit. That is, a test pattern may be an image printed on, for example, a paper medium or an image displayed on a display unit.

While the examples have been described with reference to binary RGB having a value 0 or 1, the encoding method is not limited thereto. For example, by using ternary or quaternary RGB in a tonal direction, a more precise test pattern can be generated.

According to the present embodiment, by using the above-described test pattern, that is, a test pattern including blocks each encoded using an encoding method using the difference code Y1 shown in FIG. 12 and painted a pattern color corresponding to the resultant code V, the phase correction information is extracted (computed). An example of a process (hereinafter referred to as a "phase correction information computing process") that realizes the method for extracting (computing) such phase correction information is shown in the form of a flow chart in FIG. 14. Accordingly, the phase correction information computing process is described below with reference to the flow chart shown in FIG. 14.

At step S31, the image pickup apparatus 31 including the phase detection/correction circuit 72 shown in FIG. 2 captures an image of a test pattern.

Figure 15:
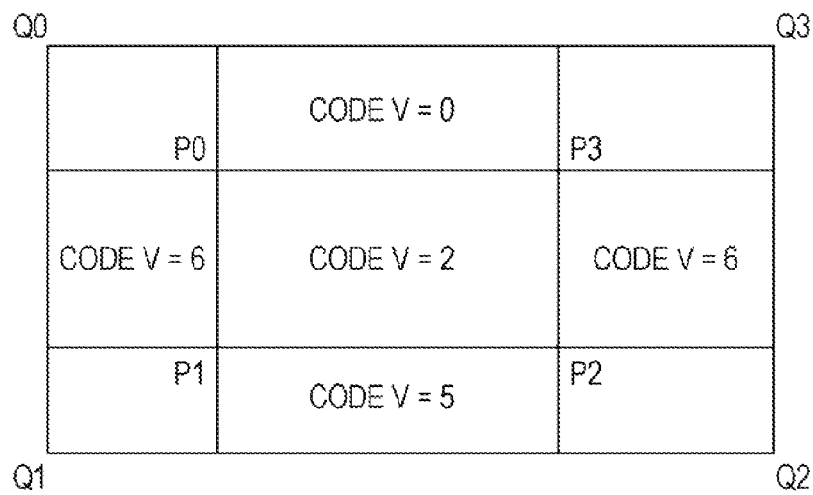
FIG. 15 is a diagram illustrating an example of a camera image captured by one of CCD sensors shown in FIG. 2 among images of the test pattern captured in the process of step S31 shown in FIG. 14.

Hereinafter, it is assumed that an image of a test pattern corresponding to the above-described image data shown in FIG. 13 has been captured at step S31. At that time, the CCD sensor 62-K captures part of the image. The partial image includes the entire one block at the center thereof and at least part of blocks immediately above, below, and to the left and right of the center block. More specifically, image data shown in FIG. 15 is captured by the CCD sensor 62-K. That is, FIG. 15 illustrates image data of the partial image of the test pattern captured by the CCD sensor 62-K. Note that, in practice, image data representing the luminance levels (R, G, B) of R, G, and B of each of the pixels are output from the CCD sensor 62-K. However, since the drawings have no color representation, the corresponding code V (see FIG. 11) is written in each of the blocks of FIG. 15.

At step S32, the phase detection/correction circuit 72 computes the absolute coordinates of the CCD sensor 62-K (hereinafter referred to as "absolute coordinates of the camera angle of view") using the image of the test pattern captured by the CCD sensor 62-K (hereinafter referred to as a "camera image"). Hereinafter, such a process performed at step S32 is referred to as a "computing process of absolute coordinates of the camera angle of view".

Figure 16:
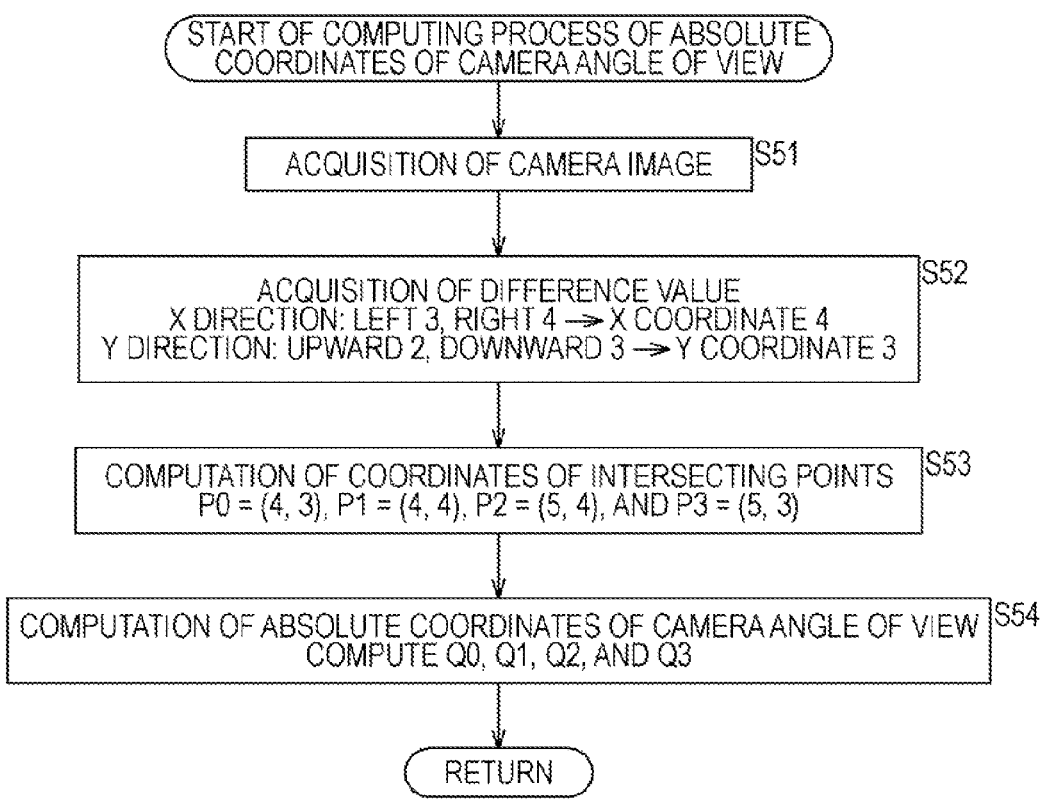
FIG. 16 is a flow chart illustrating an example of a computing process of absolute coordinates of the camera angle of view performed at step S32 shown in FIG. 14.

FIG. 16 is a detailed flow chart of the computing process of absolute coordinates of the camera angle of view performed at step S32. Accordingly, the computing process of absolute coordinates of the camera angle of view is described in detail with reference to the flow chart shown in FIG. 16.

At step S51, the phase detection/correction circuit 72 acquires a camera image (image data). Here, as described above, the camera image (image data) shown in FIG. 15 is acquired.

However, in practice, as noted above, image data representing the luminance levels (R, G, B) of R, G, and B of each of the pixels are output from the CCD sensor 62-K. Therefore, the phase detection/correction circuit 72 refers to the table shown in FIG. 11 using such image data and performs a process of acquiring the code V of each block, as shown in FIG. 15. More specifically, for example, the phase detection/correction circuit 72 sequentially determines a predetermined one of pixels of the camera image to be a pixel of interest and performs the following process for the pixel of interest. That is, the phase detection/correction circuit 72 selects one of seven pattern colors in the table shown in FIG. 11 closest to the color represented by the luminance levels (R, G, E) of R, G, and B of the pixel of interest and considers the selected color to be the color of the pixel of interest. Thus, the phase detection/correction circuit 72 determines a "[CODE]" corresponding the color of the pixel of interest to be the code V. As a result of the process performed for each pixel, a camera image (image data) shown in FIG. 15, that is, a camera image (image data) including pixels each having a pixel value of the code V can be obtained.

At step S52, the phase detection/correction circuit 72 determines, for example, the center block of the camera image to foe a block of interest. Subsequently, the phase detection/correction circuit 72 acquires a difference value between the code V of the block of interest and each of the blocks immediately above, below, and to the left and right of the block of interest. That is, in the process performed at step S52, the above-described, first difference code Y1 to fourth difference code Y1 are computed.

More specifically, for example, in this case, since the earners image shown in FIG. 15 has been acquired in the process of step S51, the code V of the block of interest, is 2. Accordingly, since the code V of the block immediately to the left of the block of interest is 6, a difference between the code V of the block of interest and the code V of the block immediately to the left of the block of interest, that is, the first difference code Y1 of 3 (=2−6+7) can be computed. In addition, since the code V of the block immediately to the right of the block of interest is 6, a difference between the code V of the block of interest and the code V of the block immediately to the right of the block of interest, that is, the second difference code Y1 of 4 (=6−2) can be computed. Similarly, since the code V of the block immediately above the block of interest is 0, a difference between the code V of the block of interest and the code V of the block immediately above the block of interest, that is, the third difference code Y1 of 2 (=2−0) can be computed. In addition, since the code V of the block immediately below the block of interest is 5, a difference between the code V of the block immediately below the block of interest and the code V of the block of interest, that is, the fourth difference code Y1 of 3 (=5−2) can be computed.

At step S53, the phase detection/correction circuit 72 computes the coordinates of an intersecting point, between the block of interest and each of the blocks immediately above, below, and to the left and right of the block of interest in the test pattern coordinate system using the difference values obtained in the process of step S52.

In this case, in the process of step S52, the first difference code Y1 of 3 has been acquired and the second difference code Y1 of 4 has been acquired. Therefore, according to the rule shown in FIG. 12, when a set of the first difference code Y1 and the second difference code Y1 is a set of 3 and 4, the value X of the set, that is, the X coordinate of the center block is 4. Similarly, in the process of step S53, the third difference code Y1 of 2 has been acquired and the fourth difference code Y1 of 3 has been acquired. Therefore, according to the rule shown in FIG. 12, when a set of the first, difference code Y1 and the second difference code Y1 is a set of 2 and 3, the value X of the set, that is, the Y coordinate of the center block is 3. That is, the coordinates of the block of interest are (4, 3). Mote that, as mentioned earlier, the coordinates of the block of interest refer to the coordinates of the upper left corner of the block of interest. In the example shown in FIG. 15, the coordinates of the block of interest are represented by the coordinates of an intersecting point P0.

In this way, the coordinates of an intersecting point P0 are computed to be (4, 3). Using the coordinates of the intersecting point P0, the coordinates of an intersecting point P1 are computed to be (4, 4), the coordinates of an intersecting point P2 are computed to be (5, 4), and the coordinates of an intersecting point P3 are computed to be (5, 3).

At step S54, the phase detection/correction circuit 72 computes the absolute coordinates of the angle of view of the camera using the coordinates of the intersecting points of the block of interest in the test pattern coordinate system, the coordinates which are computed in the process of step S53.

In this case, since the coordinates of the intersecting points P0, P1, P2, and P3 of the block of interest in the test pattern coordinate system have been computed in the process of step S53, the phase detection/correction circuit 72, for example, converts these coordinates to the absolute coordinates. Thereafter, the phase detection/correction circuit 72 computes the absolute coordinates of points Q0, Q1, Q2, and Q3 as the absolute coordinates of the angle of view of the camera using the absolute coordinates of the intersecting points P0, P1, P2, and P3 of the block of interest.

Thus, the process of computing the absolute coordinates of the camera angle of view shown in FIG. 16 has been completed. Subsequently, the process proceeds to step S33 shown in FIG. 14.

At step S33, the phase detection/correction circuit 72 computes the distortion of the object to be imaged.

At step S34, the phase detection/correction circuit 72 stores information about the angle of view corresponding to the positions U and 3' and the zoom ratio r of the CCD sensor 62-K (e.g., the absolute coordinates of the camera angle of view obtained in the process of step S32), and information about the distortion (e.g., the computation result of the process of step S33) in the phase correction information memory 73 as the phase correction information.

Thus, the phase correction information computing process has been completed.

The above-described phase correction information computing process is carried out for each of several patterns concerning the positions u and v and the zoom ratio r so that the phase correction information is obtained for each of the patterns. The obtained phase correction information is stored in the phase correction information memory 73.

A method for correcting the phase (a method for using the phase correction information) is described next.

Figure 17:
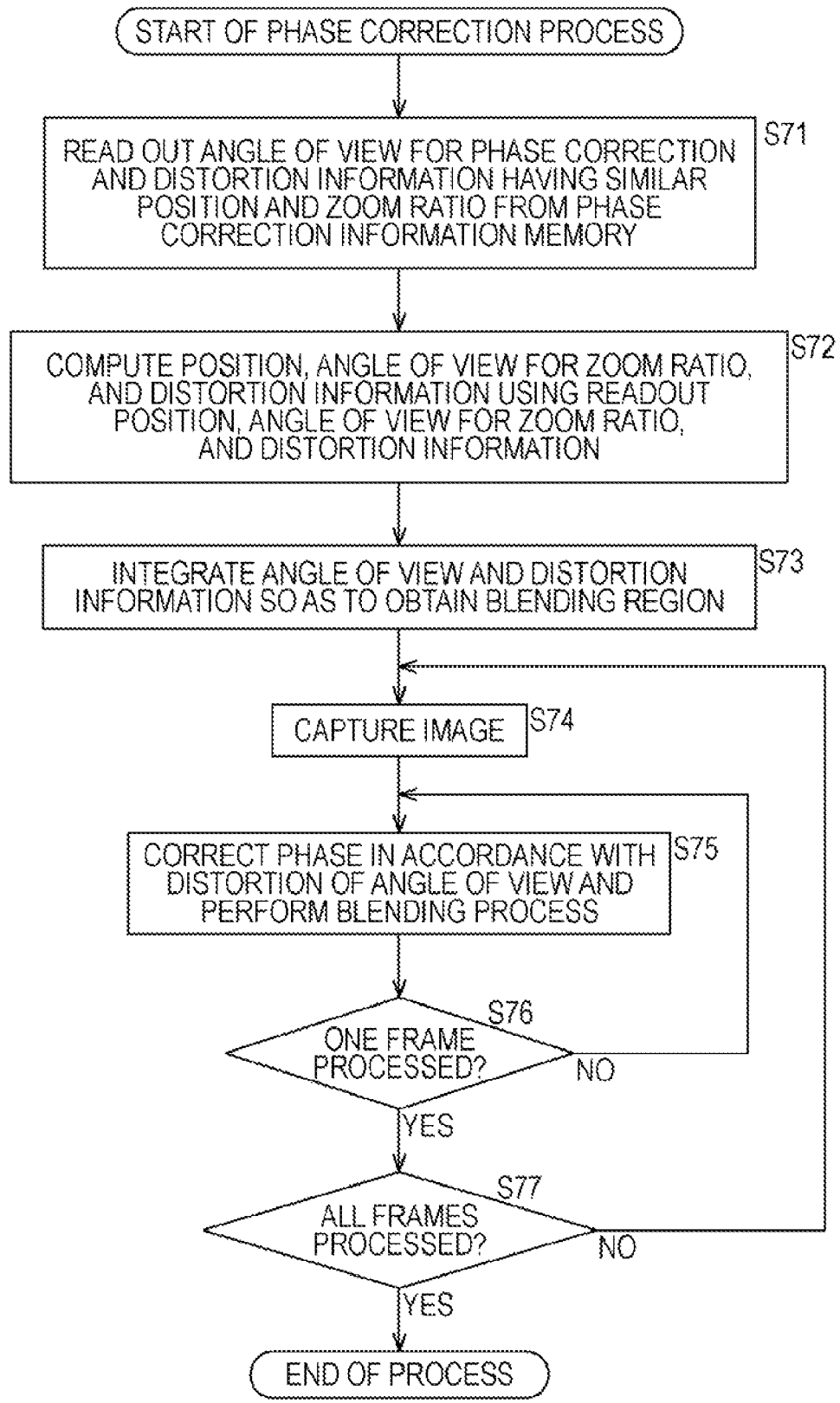
FIG. 17 is a flow chart illustrating an example of a phase correction process.

FIG. 17 is a flow chart illustrating an exemplary process corresponding to the method for correcting the phase (hereinafter referred to as a "phase correction process"). Accordingly, the phase correction process is described below with reference to FIG. 17.

At step S71, the phase detection/correction circuit 72 reads out the phase correction information (information about the angle of view and the distortion for phase correction) having a position and a zoom ratio close to the current ones from the phase correction information memory 73 for each of the CCD sensors 62-1 to 62-N.

At step S72, the phase detection/correction circuit 72 computes phase correction information (information about the angle of view and the distortion for phase correction) for the current position and zoom ratio using the phase correction information (information about the angle of view and the distortion for phase correction) having a position and a zoom ratio close to the current ones for each of the CCD sensors 62-1 to 62-N.

At step S73, the phase detection/correction circuit 72 integrates the information about the angle of view and the information about the distortion computed in the process of step S72 so as to obtain the blending portions in the absolute coordinate system.

At step S74, the image pickup apparatus 31 including the phase detection/correction circuit 72 captures an image of the object. After the frame captured in the process of step S74 is determined to be a frame of interest, the process proceeds to step S75.

At step S75, the phase detection/correction circuit 72 determines a predetermined one of input pixels of the frame of interest to be an input pixel of interest. Thereafter, the phase detection/correction circuit 72 performs phase correction in accordance with the angle of view so as to carry out a blending process. An example of the blending process is described later with reference to FIG. 13.

At step S76, the phase detection/correction circuit 12 determines whether the process has been completed for all the pixels of the frame of interest.

If, at step S76, it is determined that the process has not been completed for all the pixels of the frame of interest, the process returns to step S75. Thereafter, the subsequent processes are repeated.

That is, a loop consisting of steps S75 and S76 is repeatedly executed. Thus, phase correction in accordance with the distortion of the angle of view is carried out for all the pixels of the frame of interest, and the blending process is carried out. As a result, the frame of interest subjected to the phase correction in accordance with the distortion of the angle of view and subjected to the blending process is delivered to the luminance defection/correction circuit 74.

Thereafter, it is determined at step S76 that the process has been completed for all the pixels of the frame of interest, and therefore, the process proceeds to step S77.

At step S77, the phase detection/correction circuit 72 determines whether image capturing of all the frames has been completed (i.e., whether a user instructs the completion of image capturing).

If, at step S77, it is determined that image capturing for all the frames has not been completed (i.e., a user has not instructed the completion of image capturing), the process returns to step S74 and the subsequent processes are repeated.

That is, the next frame captured at the next step S74 becomes a frame of interest, and the loop consisting of steps S75 and S76 is repeatedly executed. Thus, phase correction in accordance with the distortion of the angle of view is carried out for all the pixels of the frame of interest, and the blending process is carried out. As a result, the frame of interest subjected to the phase correction in accordance with the distortion of the angle of view and subjected to the blending process is delivered to the luminance detection/correction circuit 14.

Subsequently, if, at step S77, it is determined that image capturing for all the frames has been completed (i.e., a user has instructed the completion of image capturing), the phase correction process is completed.

As described above, the phase detection/correction circuit 72 carries out the phase correction information computing process using the information about an angle of view, the information about distortion, and other parameters stored in the phase correction information memory 75. The phase detection/correction circuit 72 then integrates the information about the angle of view and the information about distortion obtained through the phase correction information computing process so as to compute the blending region in the absolute coordinate system. In this way, the phase detection/correction circuit 72 performs phase correction and carries out a blending process.

An exemplary blending process performed at step S75 is schematically described next with reference to FIG. 18.

Figure 18:
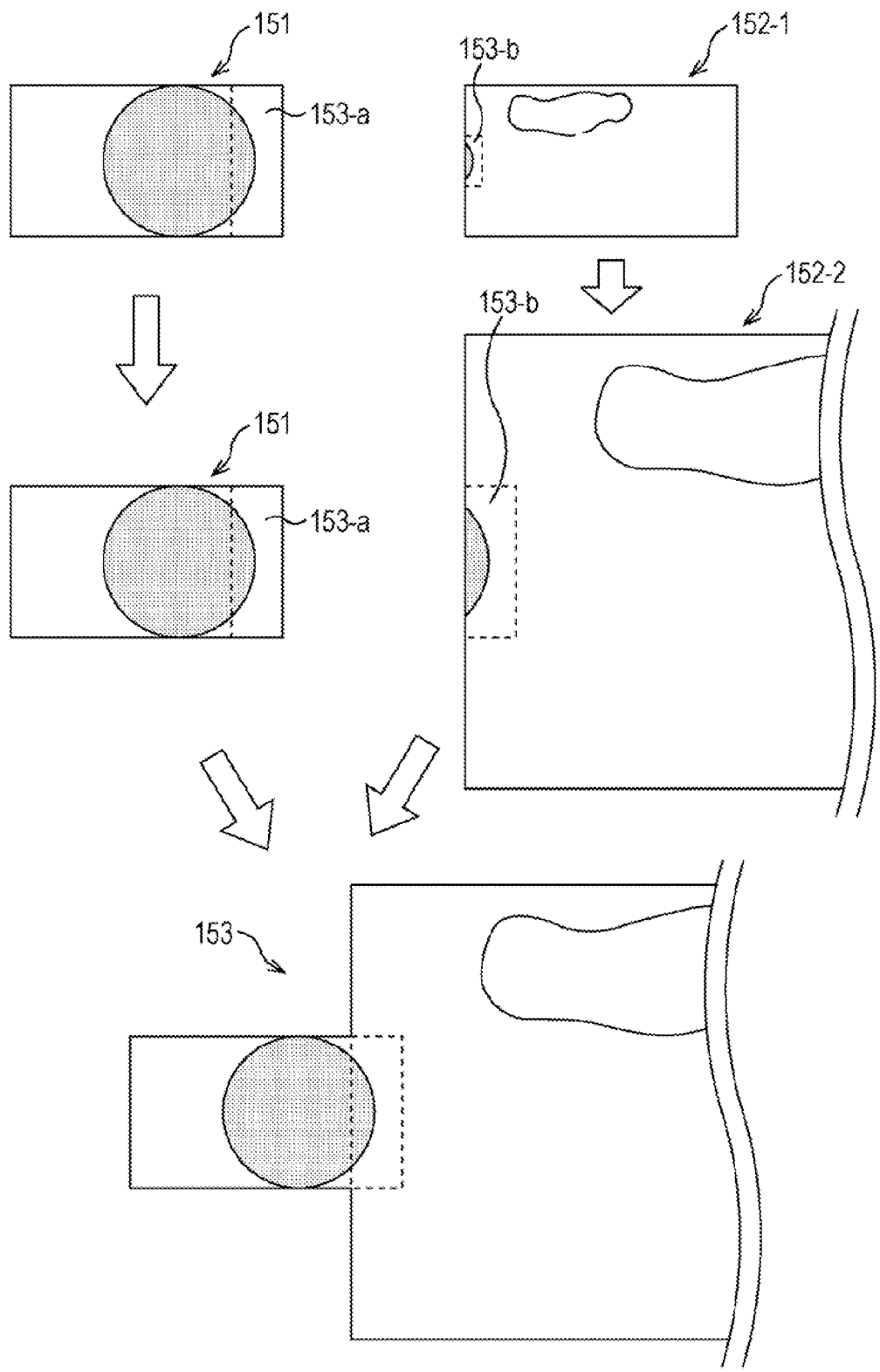
FIG. 18 is a diagram schematically illustrating an example of a blending process, which is one of the processes performed at step S75 of FIG. 17.

In FIG. 18, an image 151 is captured by one CCD sensor 62-K. The image 151 is a captured image having a partial portion captured in high resolution, as described above, such that a black circle (e.g., the above-described face of the human 102 shown in FIG. 6) included in the image 151 represents a portion that a user wants to view carefully. That is, the image 151 is captured in a "TELE" scorn mode.

In contrast, an image 152-2 is an image captured by a CCD sensor 62-K+1 immediately to the right of the CCD sensor 62-K (when viewed from the front, side of a digital camera 3) in a "WIDE" zoom mode.

In addition, it is assumed that it is determined in the process of step S73 shown in FIG. 17 that an area 153-*a* and an area 153-*b* are blending regions. In addition, phase correction (part of the process performed at step S75) has already been performed on the image 151 and an image 152-1.

In this case, the phase detection/correction circuit 72 performs an enlargement process on the image (image data) 152-1 so that the blending region 153-*a* and the blending region 153-*b* have the same resolution (the same size). Thus, the image (image data) 152-2 shown in FIG. 18 can be obtained. Any method can be employed for enlarging the image. For example, to enlarge an image to A times the original image in the left-right direction and to E times the original image in the upward-downward direction (where A and B are independent positive values greater than or equal to 1), A×B pixels that correspond to one original pixel may be generated. In such a case, any method for determining the pixel value of each of the A×B pixels can be employed. For example, each of the A×B pixels may have the pixel value of the one original pixel. Alternatively, the A×B pixels may have individual pixel values determined, on the basis of the correlation with the adjacent pixels (the pixels adjacent to the one original pixel).

Subsequently, the phase detection/correction circuit 72 combines the image (image data) 151 with the image (image data) 152-2 so as to generate a composite image 153.

Note that any method for combining the blending portion 153a with the blending portion 153-b can be employed. For example, the pixel value of each of the pixels of the blending portion 153-a is directly used for the pixel value of the corresponding pixel of the composite image. Alternatively, predetermined computation (e.g., average computation) may be performed using the pixel values of the pixels of the blending portion 153-a and the pixel values of the pixels of the blending portion 153-b. The resultant, values of the computation can be used for the pixel values of the corresponding pixels of the composite image.

In addition, in all of the above-described methods, a border (an edge portion) between a portion of the composite image 153 corresponding to the blending portion 153-a and the other portion tends to become an unnatural image (an unnatural image to the human eye). Accordingly, the phase detection/correction circuit 72 can perform predetermined image processing on the edge portion. Any method can be used for the image processing. For example, a process of decreasing the luminance values (the pixel values) in the edge portion and in the vicinity of the edge portion can be employed. In such a case, any method for decreasing the luminance values may be employed. For example, the luminance values may be linearly decreased in a direction from the portion corresponding to the blending portion 153-a to any other portion. Alternatively, the luminance values may be decreased along a sins curve having the peak point corresponding to the edge portion.

In the above-described example shown in FIG. 17, such a blending process is performed by the phase detection/correction circuit 72, that is, the digital camera 3 that captures the image. However, the present invention is not limited thereto. The blending process may be performed by a playback unit of the image, such as a display unit (not shown).

Figure 19:
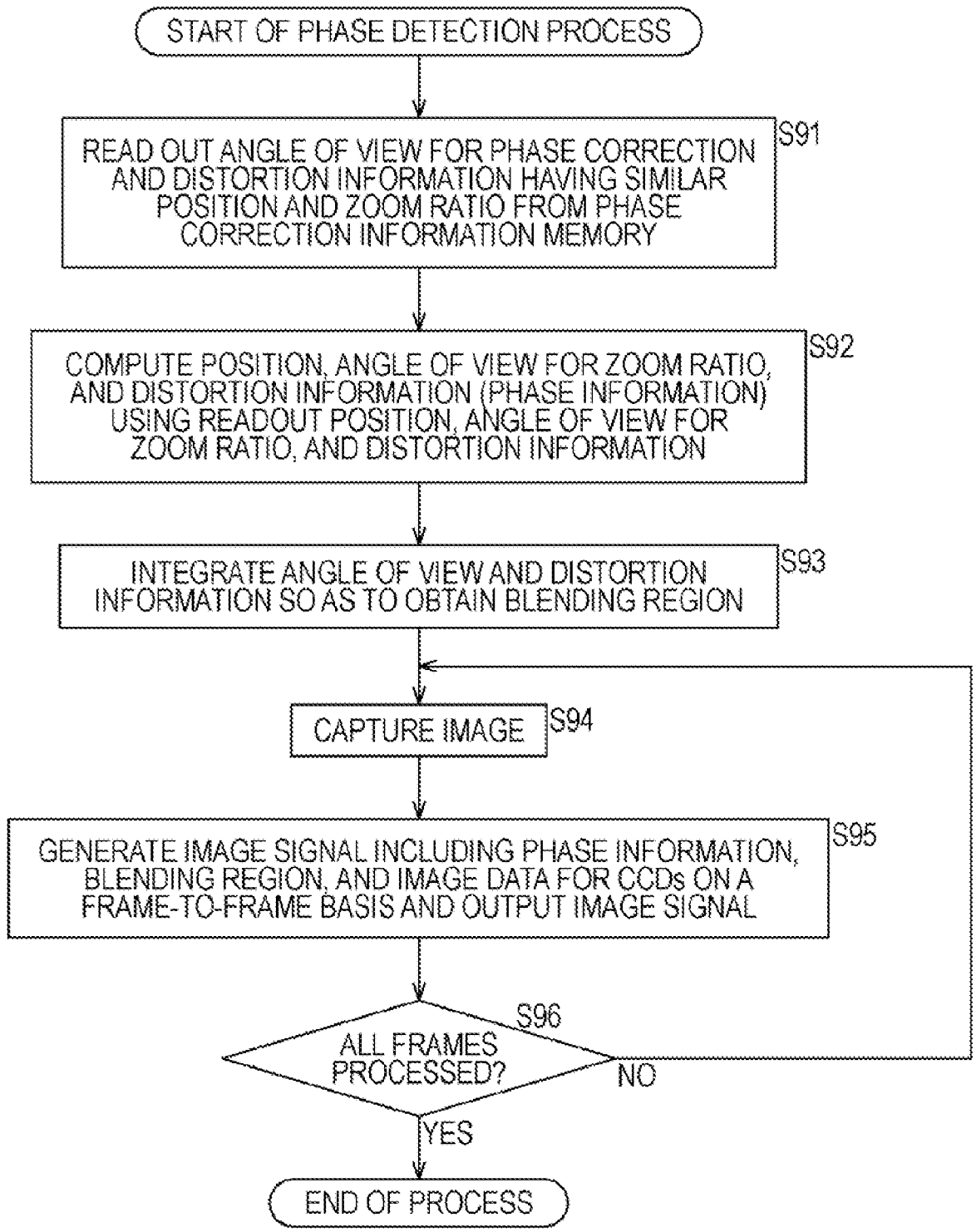
FIG. 19 is a flow chart illustrating an example of a phase detection process.

When the blending process is performed by a playback unit, such as a display unit (not shown), the phase detection/correction circuit 72 may perform a phase detection process, as shown in FIG. 19, in place of the phase correction process shown in FIG. 17.

Processes performed at steps S91 to S93 of the phase defection process shown in FIG. 19 are basically similar to the processes performed at steps S71 to S73 of FIG. 17, Therefore, a process of step S94 and processes subsequent to step S94 are described below.

At step S94, the image pickup apparatus 31 including the phase detection/correction circuit 72 captures the image of an object.

At step S95, the phase detection/correction circuit 72 generates an image signal including the phase information computed in the process performed at step S92, the blending portion obtained in the process performed at step; S93, and image data of the CCD sensors 62-1 to 62-M on a frame-to-frame basis. The phase detection/correction circuit 72 then outputs the generated image signal.

That, is, the phase information, the blending portion, and the image data of the CCD sensors 62-1 to 62-N for the frame of interest are combined into the image signal of the frame of interest. The image signal of the frame of interest is delivered to the luminance detection/correction circuit 14 shown in FIG. 2.

In this case, for example, the luminance defection/correction circuit 74 performs steps S11 to S13 of the above-described luminance correction process shown in FIG. 10. The luminance detection/correction circuit 74 adds a minimum value MIN{S(x, y)} of the curved surface to the image signal representing the frame of interest delivered from the phase detection/correction circuit 72. The luminance detection/correction circuit 74 then externally outputs the image signal. That is, in this case, a signal output from the signal processing unit 44 is an image signal into which the phase information, the blending portions, the image data of the CCD sensors 62-1 to 62-N, and the minimum value MIN{S(x, y)} of the curved surface for the frame of interest are integrated.

Upon receipt of such an image signal, the playback unit performs the processes corresponding to step S15 of FIG. 10 and step S75 of FIG. 17 so as to generate (construct) image data corresponding to the frame of interest. Thus, the image corresponding to the image data, that is, the frame of interest can be displayed.

At step S96, the phase detection/correction circuit 72 determines whether image capturing for all the frames has been completed (i.e., whether a user has instructed the completion of image capturing).

If, at step S96, it is determined that image capturing for all the frames has not been completed (i.e., a user has not instructed the completion of image capturing), the process returns to step S94 and the subsequent, processes are repeated.

That is, the next frame captured at the next step S94 becomes a frame of interest. The phase information, the blending portions, and the image data of the CCD sensors 62-1 to 62-K for the frame of interest (i.e., the next frame) are integrated into an image signal for the frame of interest (i.e., the next frame). This image signal is delivered to the luminance detection/correction circuit 14 shown in FIG. 2.

Thereafter, if, at step S96, it is determined that image capturing has been completed for all, the frames (i.e., the user has instructed the completion of image capturing), the phase detecting process has been completed.

So far, the image pickup apparatus 31 in the example shown in FIG. 2 has been described.

In summary, the image pickup apparatus 31 has at least the following first to thirteen features.

The first feature is that the image pickup apparatus 31 is a high-resolution and fine-resolution image pickup apparatus of a focal coincidence type including image pickup elements, such as the CCD sensors 62-K, arranged in an array.

The second feature is that the image pickup apparatus 31 is an image pickup apparatus including an optical system composed of the first image formation system 41 that forms an image of focal coincidence, the image formation plane of the first image formation system 41, and the second image formation system group 42 having a plurality of image pickup elements arranged in an array for capturing the images formed in the image formation plane.

The third feature is that the field lens 43 can be disposed in the image formation plane that connects the first image formation system 41 with the second image formation system group 42 or in the vicinity of the image formation plane.

The fourth feature is that, in place of the field lens 43, a diffuser (not shown) can be disposed in the image formation plane that connects the first image formation system 41 with the second image formation system group 42 or in the vicinity of the image formation plane.

The fifth feature is that each of a plurality of the second image formation systems included in the second image formation system group 42 is disposed so as to hold a part of a first image captured by the CCD sensor 62-K included in one of the second image formation systems and a part of a second image captured by another CCD sensor included in another second image formation system as a blending region where the first image is connected to the second image.

The sixth feature is that the optical system of the image pickup apparatus 31 can be composed of only lenses (i.e., no prisms are employed). This feature is caused by the effect of the first feature. According to the sixth feature, even when the number of image pickup elements, such as CCD sensors, is increased, an image pickup apparatus that can capture a high-resolution and fine-resolution image can be achieved at a low cost.

The seventh feature is that the image pickup apparatus 31 includes a mechanism that can change the positions and amount, of zoom of a plurality of image pickup elements in the second image formation system group 42 independently. According to the seventh feature, a partial high-resolution image can be captured.

The eighth feature is that this mechanism includes a zoom actuator and a position control actuator.

The ninth feature is that the image pickup apparatus 31 further includes a circuit for computing a high-resolution image capturing area when a partial high-resolution image is captured, that is, the high-resolution image capturing range computing circuit 76 and an interface through which a user instructs the high-resolution image capturing area, such as the high-resolution image capturing range computing circuit 76.

The tenth feature is that the image pickup apparatus 31 further includes the phase detection/correction circuit 72 for correcting the phase of an image formed on a plurality of the image pickup elements, such as the CCD sensors 62-K, and the phase correction information memory 73 for storing phase correction information used for the phase correction.

The eleventh feature is that, to acquire (extract) the phase correction information, the above-described extraction method is applied to the phase detection/correction circuit 72. As a result, the phase detection/correction circuit 72 can carry out, for example, the phase correction information computing process shown in FIG. 11. In addition, at that time, the above-described test pattern can be used. This feature is also included in the eleventh feature.

The twelfth feature is that the image pickup apparatus 31 further includes the luminance detection/correction circuit 74 for correcting the luminance of the images formed on the plurality of image pickup elements, such as the CCD sensors 62-K, and the luminance correction information memory 75 for storing the luminance correction information used for the luminance correction.

The thirteenth feature is that, to acquire (extract) the luminance correction information, the above-described extraction method is applied to the luminance detection/correction circuit 72. As a result, the phase detection/correction circuit 74 can carry out, for example, the luminance correction information computing process shown in FIG. 9. In addition, at that time, the above-described test pattern can be used. This feature is also included in the thirteenth feature.

The first to thirteenth features are summarized as follows. The image pickup apparatus 31 is a high-resolution and fine-resolution fixed focal length image capturing apparatus capable of having a blending region by using the first image formation system 41 and the second image formation system group 42. In the image pickup apparatus 31, image pickup elements can be sealably disposed at a low cost. In addition, the image pickup apparatus 31 can capture a partial high-resolution image. Furthermore, the image pickup apparatus 31 can automatically and independently perform distortion correction, such as phase correction and luminance correction, for each of the second image formation systems of the second image formation system group 42, which is an image capturing system.

That is, the image pickup apparatus 31 can provide at least the following first to third advantages. The first, advantage is that high-resolution and fine-resolution images that have blending regions and that can be seamlessly connected with each other can be captured. The second advantage is that a plurality of image pickup elements can be arranged at a low cost and a partial high-resolution image can be captured. The third advantage is that luminance correction information and phase correction information can be automatically acquired.

The above-described series of processes can be executed by hardware. In addition, the above-described series of processes can be executed by software.

In this case, at least part of the signal processing unit 44 of the image pickup apparatus 31 shown in FIG. 2 can be achieved by, for example, the computer shown in FIG. 20.

In FIG. 20, a central processing unit (CPU) 201 carries out a variety of processes in accordance with a program stored in a read only memory (ROM) 202 or a program loaded from a storage unit 208 into a random access memory (RAM) 203. In addition, data required for the CPU 201 to carry out the variety of processes are stored in the RAM 203 as needed.

The CPU 201, the ROM 202, and the RAM 203 are connected to each other via a bus 204. In addition, an input/output interface 205 is connected to the bus 204.

An input unit 206 including a keyboard and a mouse, an output unit 207 including a display, a storage unit 208 including, for example, a hard disk, and a communication unit 209 including a modem and a terminal adaptor are connected to the input/output interface 205. The communication unit 209 controls communication between the image pickup apparatus and other apparatuses (not shown) via a network including the Internet.

Furthermore, a drive 210 is connected to the input/output interface 205 as needed. A removable recording medium 211 including a magnetic disk, an optical disk, a magnetooptical disk or a semiconductor memory is mounted on the drive 210 as needed. A computer program read out from the removable recording medium 211 is installed in the storage unit 208 as needed.

When the series of processes is executed by software, a program of the software is installed in a computer incorporated in dedicated hardware or a computer (e.g., a general-purpose personal, computer) that can execute a variety of programs by installing the programs therein via a network or a recording medium.

As shown in FIG. 20, examples of the recording medium that stores such a program include the removable recording medium 211 including a magnetic disk (including a flexible disk), an optical disk (including a compact disk-read only memory (CD-ROM) and a digital versatile disk (DVD)), a magnetooptical disk (including a mini-disk (MD)), and a semiconductor memory. The removable recording medium 211 is distributed to users independently from the apparatus in order to provide the program to the users. In addition, examples of the recording medium include the ROM 202 that stores the program and a hard disk incorporated in the storage unit 208, which are assembled in the apparatus in advance and are provided to the users together with the apparatus.

In the present specification, the steps that describe the program stored in the recording media include not only processes executed in the above-described sequence, but also processes that may be executed in parallel or independently.

In addition, as used in the present specification, the term "system" refers to a whole apparatus including a plurality of devices and processing units.

Furthermore, while the description above has been made with reference to a frame as a unit of the various image processing, the unit may be a field. That is, when a unit of an image, such as a frame or a field, is referred to as an "access unit", the above-described unit of the image processing can serve as an access unit.

The invention claimed is:

1. An image pickup apparatus of a focal coincidence type having a plurality of image pickup elements arranged in an array, comprising:

an optical system including a first image formation system for forming an image of focal coincidence, an image formation plane in which the image is formed by the first image formation system, and a second image formation system group, the second image formation system group including a plurality of second image formation systems each including one of the image pickup elements, each of the image pickup elements capturing an image obtained by reforming a predetermined part, of the image formed in the image formation plane, the plurality of second image formation systems being arranged in an array; and a diffuser disposed in the image formation plane or adjacent to the image formation plane, the image formation plane connecting the first image formation system with the second image formation system group.

2. The image pickup apparatus according to claim 1, wherein each of the plurality of the second image formation systems included in the second image formation system group is disposed so as to maintain a part of a first image captured by the image pickup element included in the one of the second image formation systems and a part of a second image captured by the image pickup element included in another one of the second image formation system as a blending region where the first image is connected to the second image.

3. The image pickup apparatus according to claim 1, further comprising:

a phase correction information holding unit configured to hold phase correction information used for correcting the phases of images formed on the plurality of image pickup elements.

4. The image pickup apparatus according to claim 3, further comprising:

a phase correction information computing unit configured to compute the phase correction information in advance using images obtained by reforming an image of a predetermined test pattern formed in the image formation plane on at least one of the plurality of image pickup elements and configured to cause the phase correction information holding unit to hold the phase correction information.

5. The image pickup apparatus according to claim 3, further comprising:

a phase correction unit configured to correct the phase of each of the images obtained by reforming an image of an object formed on the image formation plane on the plurality of image pickup elements using the phase correction information held in the phase correction information holding unit.

6. The image pickup apparatus according to claim 1, further comprising:

a luminance correction information holding unit configured to hold luminance correction information used for correcting the luminance of images formed on the plurality of image pickup elements.

7. The image pickup apparatus according to claim 6, further comprising:

a luminance correction information computing unit configured to compute the luminance correction information in advance using images obtained by reforming an image of a predetermined test pattern formed in the image formation plane on at least one of the plurality of image pickup elements and configured to cause the luminance correction information holding unit to hold the luminance correction information.

8. The image pickup apparatus according to claim 6, further comprising:

a luminance correction unit configured to correct the luminance of each of the images obtained by reforming an image of an object formed, on the image formation plane on the plurality of image pickup elements using the luminance correction information held in the luminance correction information holding unit.

9. An image pickup apparatus of a focal coincidence type having a plurality of image pickup elements arranged in an array, comprising:

an optical system including a first image formation system for forming an image of focal coincidence, an image formation plane in which the image is formed by the first image formation system, and a second image formation system group, the second image formation system group including a plurality of second image formation systems each including one of the image pickup elements, each of the image pickup elements capturing an image obtained by reforming a predetermined part, of the image formed in the image formation plane, the plurality of second image formation systems being arranged in an array, wherein each of the plurality of the second image formation systems included in the second image formation system group is disposed so as to maintain a part of a first image captured by the image pickup element included in the one of the second image formation systems and a part of a second image captured by the image pickup element included in another one of the second image formation system as a blending region where the first image is connected to the second image; and wherein each of the plurality of the second image formation systems included in the second image formation system group includes a lens for reforming the predetermined part of the image formed in the image formation plane on the one of image pickup elements and wherein the following expression is satisfied:

$$2 \times F \times \tan(\Phi/2) > D$$

where F denotes a distance between the image formation plane and the lens, $\Phi$ denotes the width of a light beam corresponding to the blending region among light beams output from the image formation plane, and D denotes a distance between the one of image pickup elements and the image pickup element immediately adjacent to the one of image pickup elements.

10. The image pickup apparatus according to claim 9, further comprising:
a mechanism configured to individually change the position of the image pickup element and zooming of the lens in each of the plurality of the second image formation systems included in the second image formation system group independently from other ones of the second image formation systems.

11. The image pickup apparatus according to claim 10, wherein the mechanism includes a first actuator configured to drive each of a plurality of the lenses independently from another one of the lenses to change the zooming thereof and a second actuator configured to drive each of a plurality of the image pickup apparatuses independently from the other one of the image pickup apparatuses to change the position thereof.

12. The image pickup apparatus according to claim 10, wherein the image pickup apparatus causes each of at least one of the image pickup elements included in at least one of the second image formation systems included in the second image formation system group to capture an image having a resolution higher than those captured by the other image pickup elements using the mechanism, and wherein the image pickup apparatus further comprises a computing unit configured to perform computation so as to determine a range of the image captured in high resolution when the high-resolution image is captured.

13. The image pickup apparatus according to claim 12, further comprising:
an interface unit through which a user performs an operation to select the range of the image captured in high resolution;
wherein the computing unit computes the range of the image captured in high resolution on the basis of the user operation through the interface unit.

14. An image pickup apparatus of a focal coincidence type having a plurality of image pickup elements arranged in an array, comprising:
an optical system including:
a first image formation system for forming an image of focal coincidence;
an image formation plane in which the image is formed by the first image formation system;
a second image formation system group, the second image formation system group including a plurality of second image formation systems each including one of the image pickup elements, each of the image pickup elements capturing an image obtained by reforming a predetermined part, of the image formed in the image formation plane, the plurality of second image formation systems being arranged in an array;
a field lens disposed in the image formation plane or adjacent to the image formation plane, the image formation plane connecting the first image formation system with the second image formation system group; and
a mechanism configured to individually shift a position of each of the image pickup elements independently from others of the image pickup elements.

15. A method for capturing an image for use in an image pickup apparatus including at least a first image formation system and a plurality of second image formation systems having image pickup elements, the method comprising the steps of:
forming an image of focal coincidence on a predetermined image formation plane with the first image formation system;
reforming a predetermined part of the image formed on the image formation plane on one of the image pickup elements included in one of the second image formation systems;
shifting an individual position of each of the image pickup elements independently from others of the image pickup elements; and
capturing the predetermined part of the image reformed on each of the image pickup elements.

16. A method for designing an image pickup apparatus including at least a first image formation system and a plurality of second image formation systems having image pickup elements, the method comprising the steps of:
forming an image of focal coincidence on a predetermined image formation plane with the first image formation system;
reforming a predetermined part of the image foil led on the image formation plane on one of the image pickup elements included in one of the second image formation systems; and
shifting an individual position of each of the image pickup elements independently from others of the image pickup elements.

17. A method for capturing an image for use in an image pickup apparatus, the image pickup apparatus including an optical system including a first image formation system for forming an image of focal coincidence, an image formation plane in which the image is formed by the first image formation system, and a second image formation system group including a plurality of second image formation systems each including an image pickup element that captures an image formed thereon and a lens that reforms a predetermined part of the image formed in the image formation plane on the image pickup element, the plurality of second image formation systems being arranged in an array, the method comprising the steps of:
in order to maintain a part of a first image captured by the image pickup element included in one of the second image formation systems and a part of a second image captured by the image pickup element included in another second image formation system as a blending region where the first image is connected to the second image, disposing each of the plurality of second image formation systems included in the second image formation system group so as to satisfy the following expression:

$$2 \times F \times \tan(\Phi/2) > D$$

where F denotes a distance between the image formation plane and the lens, $\Phi$ denotes the width of a light beam corresponding to the blending region among light beams output from the image formation plane, and D denotes a distance between the one of image pickup elements and the image pickup element immediately adjacent to the one of image pickup elements; and
capturing an image of an object by the image pickup apparatus.

* * * * *